(12) United States Patent
Hiramatsu et al.

(10) Patent No.: US 11,165,135 B2
(45) Date of Patent: Nov. 2, 2021

(54) ANTENNA UNIT FOR GLASS, GLASS SHEET WITH ANTENNA, AND PRODUCTION METHOD OF ANTENNA UNIT FOR GLASS

(71) Applicants: AGC Inc., Chiyoda-ku (JP); NTT DOCOMO, INC., Chiyoda-ku (JP)

(72) Inventors: Tetsuya Hiramatsu, Tokyo (JP); Ryuta Sonoda, Tokyo (JP); Osamu Kagaya, Tokyo (JP); Kentaro Oka, Tokyo (JP); Akira Saito, Tokyo (JP); Kensuke Miyachi, Tokyo (JP); Akinobu Ueda, Tokyo (JP); Yoshiyuki Kawano, Tokyo (JP); Jun Andou, Tokyo (JP); Taku Yamazaki, Tokyo (JP)

(73) Assignees: AGC Inc., Chiyoda-ku (JP); NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 16/774,209

(22) Filed: Jan. 28, 2020

(65) Prior Publication Data
US 2020/0161741 A1     May 21, 2020

Related U.S. Application Data

(63) Continuation of application No. PCT/JP2018/028866, filed on Aug. 1, 2018.

(30) Foreign Application Priority Data

Aug. 2, 2017   (JP) .............................. JP2017-150241

(51) Int. Cl.
*H01Q 1/12*      (2006.01)
*H01Q 1/52*      (2006.01)

(52) U.S. Cl.
CPC ........... *H01Q 1/1271* (2013.01); *H01Q 1/526* (2013.01)

(58) Field of Classification Search
CPC ........ H01Q 1/1271; H01Q 1/526; H01Q 1/22; H01Q 1/32
USPC .......................... 343/713, 846, 848, 872, 873
See application file for complete search history.

(56) References Cited

U.S. PATENT DOCUMENTS

| 5,659,324 A | * | 8/1997 | Taniguchi | ............ H01Q 1/1278 343/713 |
| 5,760,744 A | * | 6/1998 | Sauer | ................ B32B 17/10036 29/600 |
| 5,905,468 A | * | 5/1999 | Ikawa | .................. H01Q 1/1278 343/713 |

(Continued)

FOREIGN PATENT DOCUMENTS

| CN | 101228098 A | 7/2008 |
| CN | 106463812 A | 2/2017 |

(Continued)

OTHER PUBLICATIONS

International Search Report dated Oct. 23, 2018 in PCT/JP2018/028866 filed Aug. 1, 2018 (with English Translation), 5 pages.

*Primary Examiner* — Lam T Mai
(74) *Attorney, Agent, or Firm* — Oblon, McClelland, Maier & Neustadt, L.L.P.

(57) ABSTRACT

An antenna unit for glass according to the present invention is installed on the indoor side of a glass sheet, and transmits and receives electromagnetic waves at the indoor side through the glass sheet.

27 Claims, 16 Drawing Sheets

(56) References Cited

U.S. PATENT DOCUMENTS

| | | |
|---|---|---|
| 6,005,529 A | 12/1999 | Hutchinson |
| 6,118,410 A | 9/2000 | Nagy |
| 6,121,934 A * | 9/2000 | Taniguchi ............ H01Q 1/1278 |
| | | 343/704 |
| 8,350,766 B2 * | 1/2013 | Hisaeda ............... H01Q 1/1285 |
| | | 343/713 |
| 2003/0112187 A1 | 6/2003 | Whitehouse |
| 2003/0142018 A1 | 7/2003 | Lange |
| 2006/0202897 A1 | 9/2006 | Roquiny |
| 2007/0020465 A1 | 1/2007 | Thiel et al. |
| 2010/0164816 A1 * | 7/2010 | Kuribayashi ............ H01Q 7/00 |
| | | 343/713 |
| 2010/0231466 A1 * | 9/2010 | Hisaeda .................. H01Q 1/40 |
| | | 343/713 |
| 2017/0324143 A1 * | 11/2017 | Talty ........................ H01Q 1/38 |
| 2018/0037007 A1 | 2/2018 | Droste et al. |
| 2019/0152194 A1 * | 5/2019 | Schmalbuch ........ H01Q 1/1271 |

FOREIGN PATENT DOCUMENTS

| | | |
|---|---|---|
| DE | 196 10 783 A1 | 9/1997 |
| DE | 695 12 865 T2 | 5/2000 |
| EP | 1 559 167 B1 | 6/2013 |
| JP | 52-13752 | 1/1977 |
| JP | 2-4306 U | 1/1990 |
| JP | 9-502073 A | 2/1997 |
| JP | 9-162619 A | 6/1997 |
| JP | 2002-305406 A | 10/2002 |
| JP | 3437993 B2 | 8/2003 |

\* cited by examiner

ANTENNA UNIT POSITION FROM WINDOW FRAME (mm)

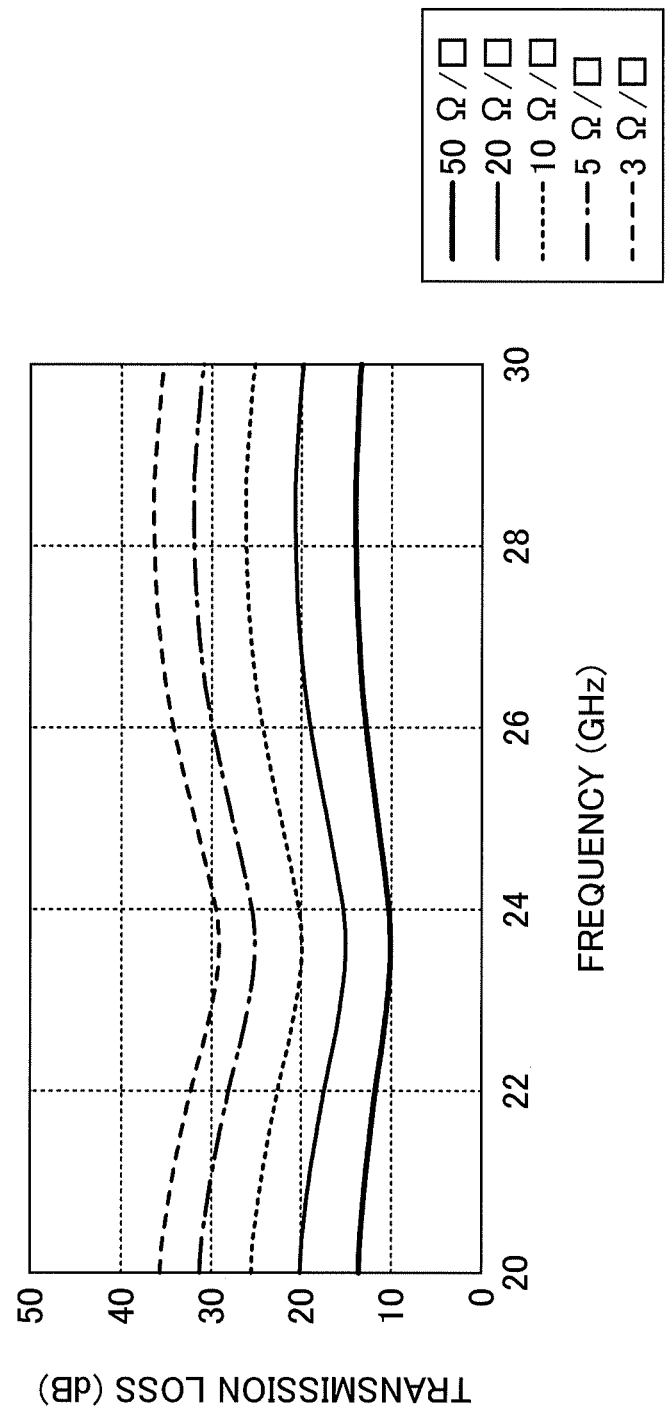

ANTENNA UNIT FOR GLASS, GLASS SHEET WITH ANTENNA, AND PRODUCTION METHOD OF ANTENNA UNIT FOR GLASS

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2018/028866 filed on Aug. 1, 2018 and designating the U.S., which claims priority of Japanese Patent Application No. 2017-150241 filed on Aug. 2, 2017. The entire contents of the foregoing applications are incorporated herein by reference.

BACKGROUND OF THE INVENTION

1. Field of the Invention

The present invention relates to an antenna unit for glass, a glass sheet with an antenna, and a production method of an antenna unit for glass.

2. Description of the Related Art

Various communication systems using wireless technology such as a mobile phone, internet communication, a radio broadcast and GPS (Global Positioning System) have been developed. Supporting these communication systems requires an antenna that can transmit and receive electromagnetic waves used by respective communication systems.

As an antenna unit used by being installed on an outer wall of a building, for example, an antenna unit using a radio wave transmission structure that includes three layers each having a different relative permittivity, and has a predetermined thickness for each layer, and has good radio wave transmission performance, is proposed (e.g., Patent Document 1).

RELATED ART DOCUMENTS

Patent Documents

Patent Document 1: Japanese Patent No. 3437993

SUMMARY OF THE INVENTION

Technical Problem

The radio wave transmission structure described in Patent Document 1 includes a surface finishing material such as glass for a first layer as an outermost layer, as air or the like for a second layer inside the outermost layer, and a porous medium, acrylic resin or the like for a third layer inside the second layer. The relative permittivity of the radio wave transmission structure in descending order is as follows: the first layer, the third layer, and the second layer.

Solution to Problem

An antenna unit for glass, according to an aspect of the present invention, is installed on an indoor side of a glass sheet, and transmits and receives electromagnetic waves at the indoor side through the glass sheet.

An antenna unit for glass, according to an aspect of the present invention, is an antenna unit that is attached to a glass sheet, and that preferably includes a fixing portion to fix the antenna on the glass sheet such that a space in which air can flow is formed between the glass sheet and the antenna.

BRIEF DESCRIPTION OF THE DRAWINGS

FIG. 19 is a drawing indicating a measurement result of transmission loss of electromagnetic waves in an example 3.

DETAILED DESCRIPTION OF THE PREFERRED EMBODIMENTS

Figure 1:
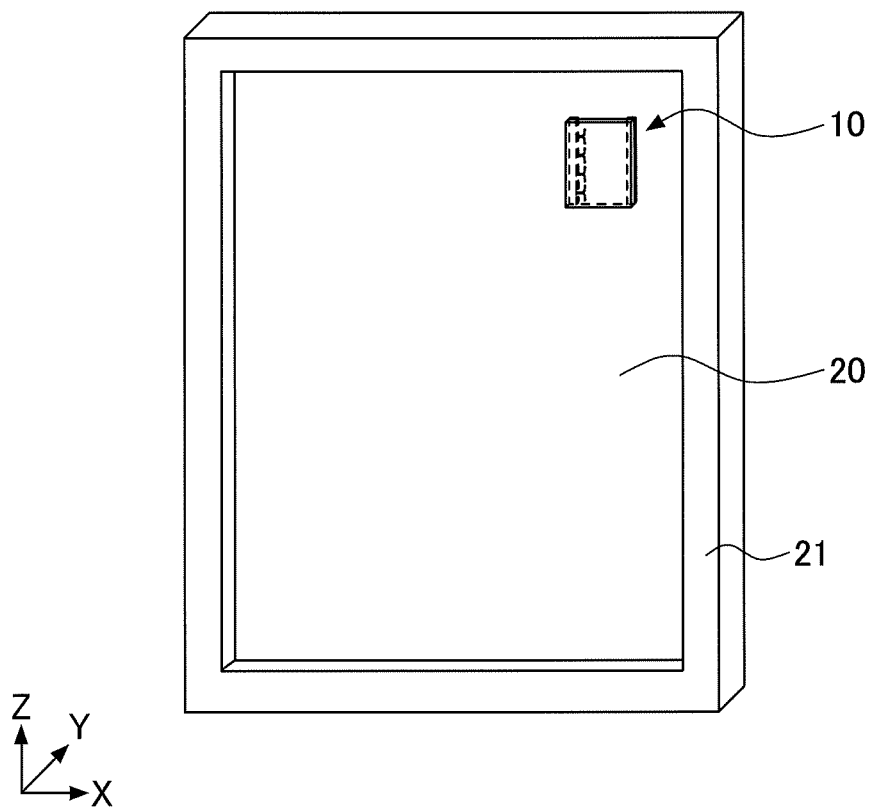
FIG. 1 is a perspective view illustrating a state in which an antenna unit for glass is attached to a glass sheet.

In the following, embodiments of the present invention will be described in details. In the drawings, the scale of each member may be different from the actual scale, for ease of understanding. In the present specification, a three-dimensional orthogonal coordinate system (i.e., an X-axis direction, a Y-axis direction, and a Z-axis direction) is used, where an X-axis is defined as a width direction of a glass sheet, a Y-axis direction is defined as a depth direction, and a Z-axis direction is defined as a height direction. A direction from the bottom to the top of a glass sheet is a +Z-axis direction, and an opposite direction is a −Z-axis direction. In the following description, a +Z-axis direction may be referred to as up, and a −Z-axis direction may be referred to as down.

<An Antenna Unit for Glass>

An antenna unit for glass according to an embodiment (which may hereinafter be simply referred to as an antenna unit) will be described. The term "for glass" in "an antenna unit for glass" indicates an antenna unit used to transmit and receive electromagnetic waves through glass.

Figure 2:
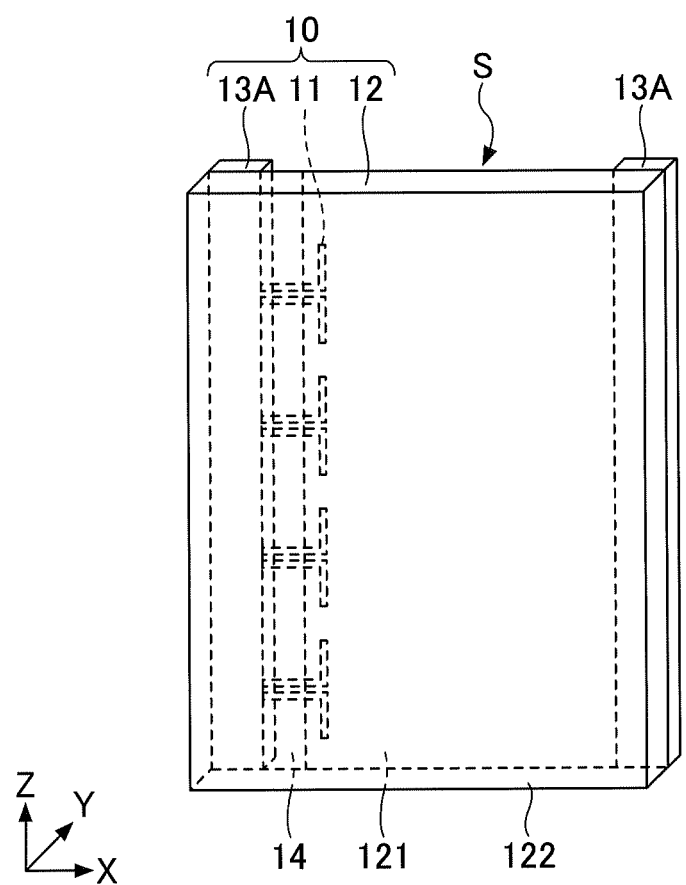
FIG. 2 is a perspective view of an antenna unit for glass.
Figure 3:
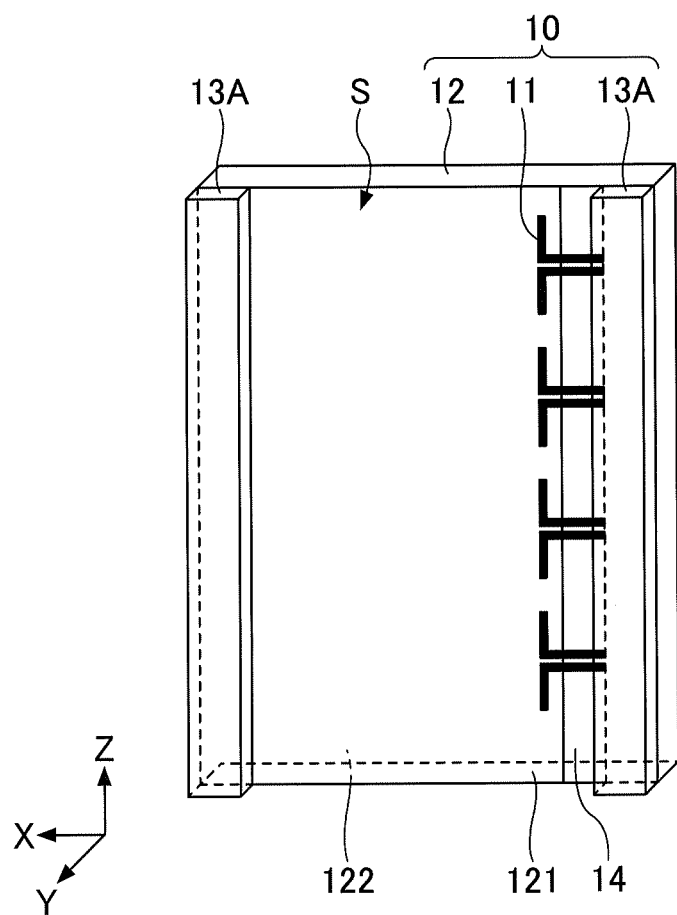
FIG. 3 is a perspective view of an antenna unit illustrated in FIG. 1 viewed through a glass sheet.

FIG. 1 is a perspective view illustrating a state in which an antenna unit for glass is attached to a glass sheet, FIG. 2 is a perspective view of an antenna unit for glass, and FIG. 3 is a perspective view of the antenna unit illustrated in FIG. 1 viewed through a glass sheet.

As illustrated in FIGS. 1 to 3, an antenna unit 10 includes an antenna 11, a flat plate 12 on which the antenna 11 is installed (i.e., an antenna installation plate), and a fixing portion 13A that is attached to the antenna installation plate 12. The antenna unit 10 is attached to a glass sheet 20 by the fixing portion 13A such that a space S is formed between the antenna installation plate 12 and the glass sheet 20. When the glass sheet 20 is a window glass, the glass sheet 20 is maintained in a state in which an outer edge of the glass sheet 20 is held by a window frame 21. In FIG. 1, the antenna unit 10 is attached to a main surface on the indoor side of the glass sheet 20. A main surface opposite to the indoor side of the glass sheet 20 is irradiated by sunlight or the like.

In the embodiment, the antenna unit 10 is attached to the glass sheet 20 (i.e., the window glass) by the fixing portion 13A in FIG. 1, however the present embodiment is not limited to this. For example, the antenna unit 10 can be hung from a ceiling or can be attached to a projecting part existing around the glass sheet 20 (i.e., the window glass) such as the window frame 21 and a window sash.

The antenna 11 is provided on a first main surface 121 of the antenna installation plate 12. The antenna 11 may be formed by printing a metal material overlapping at least a part of a ceramic layer 14 provided on the first main surface 121 of the antenna installation plate 12. Consequently, an antenna 11 is provided across a region where the ceramic layer 14 is formed and a region where the ceramic layer 14 is not formed on the first main surface 121 of the antenna installation plate 12.

As a metal material forming the antenna 11, a conductive material such as gold, silver, copper, and platinum can be used. As the antenna 11, a patch antenna or a dipole antenna can be used, for example.

Another material forming the antenna 11 can be fluorine doped tin oxide (FTO) or indium tin oxide (ITO), for example.

The ceramic layer 14 can be formed on the first main surface 121 of the antenna installation plate 12 by printing, for example. Forming the ceramic layer 14 can hide wiring connected to the antenna 11, which is not illustrated, and improves a design. According to the present embodiment, the ceramic layer 14 may not be provided on the first main surface 121, and may be provided on a second main surface 122 of the antenna installation plate 12. It is preferable that the ceramic layer 14 is provided on the first main surface 121 of the antenna installation plate 12 because the antenna 11 and the ceramic layer 14 can be provided on the antenna installation plate 12 by printing in one process.

A material of the ceramic layer may be a glass frit for example, and its thickness is from 1 to 20 μm preferably.

According to the present embodiment, the antenna 11 is provided on the first main surface 121 of the antenna installation plate 12, but may be provided inside the antenna installation plate 12. In this case, the antenna 11 can be provided in a coil form inside the antenna installation plate 12, for example.

When the antenna installation plate is a laminated glass that includes a pair of glass sheets and a resin layer sandwiched by the pair of the glass sheets, the antenna 11 can be provided between a glass sheet and a resin layer that composes a laminated glass.

The antenna 11 itself may be formed as a flat plate. In this case, an antenna in a flat plate may be directly attached to the fixing portion 13A without the antenna installation plate 12.

The antenna 11 may be provided inside a casing instead of the antenna installation plate 12. In this case, the antenna 11 formed as a flat plate may be provided inside the casing, for example. A shape of the casing is not limited and may be a rectangle.

The antenna 11 has optical transparency preferably. If the antenna 11 has optical transparency, a design can be improved and average solar absorptance can be decreased. Visible light transmittance of the antenna 11 is more than or equal to 40% preferably, and more than or equal to 60% is preferred to maintain a function of a window glass with respect to transparency. The visible light transmittance can be obtained by JIS R 3106 (1998).

The antenna is preferably formed in a mesh shape in order to have optical transparency. A mesh shape is a state in which net-like through holes are formed on a plane of the antenna 11.

When the antenna 11 is formed in a mesh shape, a cell shape of a mesh may be a square or a diamond shape. A line width of a mesh is from 5 μm to 30 μm preferably, and is from 6 μm to 15 μm more preferably. A space between lines of a mesh is from 50 to 500 μm preferably, and is from 100 to 300 μm more preferably.

An aperture ratio of the antenna 11 is more than or equal to 80% preferable, and is more than or equal to 90% more preferably. The aperture ratio of the antenna 11 is a ratio of an area of an opening portion including an opening portion of an electromagnetic shielding layer 16 per an entire area. The more the aperture ratio of the antenna 11 is, the more the visible light transmittance of the antenna 11 can be.

Thickness of the antenna 11 is less than or equal to 400 nm preferably, and is less than or equal to 300 nm more preferably. Minimum thickness of the antenna 11 is not limited to a specific value, and it may be more than or equal to 2 nm, 10 nm, or 30 nm.

When the antenna 11 is formed in a mesh shape, thickness of the antenna 11 may be from 2 μm to 40 μm. The visible light transmittance can be high by forming the antenna 11 in a mesh shape although the antenna 11 is thick.

The antenna installation plate 12 is provided in parallel to the glass sheet 20. The antenna installation plate 12 is formed in a rectangular shape in plane view, and includes the first main surface 121 and the second main surface 122. The first main surface 121 is provided such that the first main surface 121 faces the main surface of the glass sheet 20 to be attached, and the second main surface 122 is provided such that the second main surface 122 faces a direction opposite to the main surface of the glass sheet 20.

According to the present embodiment, the antenna installation plate 12 may be provided at a predetermined angle with respect to the glass sheet 20 (e.g., the window glass). The antenna unit 10 may radiate electromagnetic waves with a tilt angle in a direction that forms an angle with respect to a normal direction of a surface of the antenna unit 10 (i.e., the +Y-axis direction). For example, it is when the antenna unit 10 is installed above the ground such as a glass window of a building, and radiates electromagnetic waves to the ground in order to form an area on the ground. An angle between the antenna installation plate 12 and the glass sheet 20 (e.g., the window glass) may be more than or equal to 0 degree, 5 degree, or 10 degree so that a good direction for transmitting radio waves can be achieved. The angle between the antenna installation plate 12 and the glass sheet 20 (the window glass) may be less than or equal to 50 degrees, 30 degrees, or 20 degrees in order to transmit radio waves outside a room.

A material forming the antenna installation plate 12 is designed in accordance with an antenna performance, which is required for the antenna 11, such as power and directivity, and glass, resin, or metal can be used, for example. The antenna installation plate 12 may be formed to have optical transparency by using resin, for example. Forming the antenna installation plate 12 by a material with optical transparency enables the glass sheet 20 being seen through the antenna installation plate 12, which reduces blocking of a view from the glass sheet 20.

When glass is used for the antenna installation plate 12, a material of glass can be soda-lime-silica glass, borosilicate glass, aluminosilicate glass, or alkali-free glass, for example.

A glass sheet used as the antenna installation plate 12 can be produced by a publicly known production process, such as a float process, a fusion process, a redraw process, a press forming process, or a lifting process. A float process is preferable for a production process of the glass sheet with respect to better productivity and cost.

In plane view, the glass sheet is formed as a rectangle. A cutting method of the glass sheet can be a method of cutting by emitting a laser light to a surface of the glass sheet and moving an area illuminated by a laser light on a surface of the glass sheet, or a method of cutting mechanically by using a cutter wheel, for example.

In the present embodiment, a rectangle includes a shape with rounded corners of a rectangle and a square, in addition to a rectangle and a square. A shape of the glass sheet in plane view is not limited to a rectangle, and may be a circle, for example. The glass sheet is not limited to a single pane, and may be a laminated glass or an insulating glass.

When resin is used for the antenna installation plate 12, resin is transparent resin preferably, such as a liquid crystal polymer (LCP), polyimide (PI), polyphenylene ether (PPE), polycarbonate, acrylic resin, or fluorine resin. The fluorine resin is preferred with respect to low permittivity.

The fluorine resin can be an ethylene tetrafluoroethylene (which will hereinafter also be referred to as ETFE), a hexafluoropropylene-tetrafluoroethylene copolymer (which will hereinafter also be referred to as FEP), a tetrafluoroethylene-Propylene copolymer, a tetrafluoroethylene-hexafluoropropylene-propylene copolymer, a perfluoro (alkyl vinyl ether)-tetrafluoroethylene copolymer (which will hereinafter also be referred to as PFA), a tetrafluoroethylene-hexafluoropropylene-vinylidene fluoride copolymer (which will hereinafter also be referred to as THV), polyvinylidene fluoride (which will hereinafter also be referred to as "PVDF"), a vinylidene fluoride-hexafluoropropylene copolymer, polyvinyl fluoride, chlorotrifluoroethylene polymer, ethylene-chlorotrifluoroethylene copolymer (which will hereinafter also be referred to as ECTFE), or polytetrafluoroethylene, for example. Any of these may be used alone, or two or more may be used in combination.

The fluorine resin is preferably at least one selected from a group including ETFE, FEP, PFA, PVDF, ECTFE, and THV, and is ETFE particularly preferably with respect to better transparency, processability, and weather resistance.

The fluorine resin may be AFLEX (registered trademark).

Thickness of the antenna installation plate 12 is from 25 to 10 mm preferably. Thickness of the antenna installation plate 12 can be designed as suited in accordance with a place where the antenna 11 is installed.

When the antenna installation plate 12 is a resin, a resin formed in a film or sheet is preferred. Thickness of a film or sheet is from 25 to 1000 µm preferably, from 100 to 800 µm more preferably, and from 100 to 500 µm particularly preferably with respect to strength of holding the antenna.

When the antenna installation plate 12 is glass, thickness of the antenna installation plate is from 1.0 to 10 mm preferably with respect to strength of holding the antenna.

Arithmetic average roughness Ra of the first main surface 121 of the antenna installation plate 12 is 1.2 µm or less preferably. This is because when the arithmetic average roughness Ra of the first main surface 121 is 1.2 µm or less, air can be flowed easily in a space S formed between the antenna installation plate 12 and the glass sheet 20 as described later. The arithmetic average roughness Ra of the first main surface 121 is 0.6 µm or less more preferably, 0.3 or less still more preferably. A minimum value of the arithmetic average roughness Ra is not limited to a specific value, but it is 0.001 µm or more, for example.

The arithmetic average roughness Ra can be measured based on Japanese Industrial Standard JIS B0601:2001.

When the antenna 11 is an antenna in a flat plate, the arithmetic average roughness Ra of a main surface, which faces toward the glass sheet, of the antenna 11 is 1.2 µm or less preferably, 0.6 µm or less more preferably, and 0.3 µm or less still more preferably. When the antenna 11 is provided inside a casing, the arithmetic average roughness Ra of a main surface, which faces toward the glass sheet, of the casing is 1.2 µm or less preferably, 0.6 µm or less more preferably, and 0.3 µm or less still more preferably. The minimum value of the average roughness is not limited to a specific value, but it is 0.001 µm or more, for example.

The fixing portion 13A forms the space S where air can flow between the glass sheet 20 and the antenna installation plate 12, and fixes the antenna installation plate 12 to the glass sheet 20. The fixing portion 13A is attached to the first main surface 121 of the antenna installation plate 12. According to the present embodiment, the fixing portion 13A is provided in a rectangle shape at both ends of the X-axis direction along the Z-axis direction of the antenna installation plate 12. According to the present embodiment, the space S where air can flow is formed between the glass sheet 20 and the antenna installation plate 12 in order to suppress a local surface temperature rise of the glass sheet 20 that faces the antenna installation plate 12. Sunlight shines on a main surface outside the glass sheet 20, which heats the glass sheet 20. At this time, if air flow were to be blocked near the antenna unit 10 and the temperature of the antenna unit 10 were to rise, the temperature of the surface of the glass sheet 20 to which the antenna unit 10 is attached would tend to rise more easily than the temperature of the other surface of the glass sheet 20. In order to suppress such a temperature rise, the space S is formed between the glass sheet 20 and the antenna installation plate 12. The details on this point will be described later.

A material forming the fixing portion 13A is not particularly limited as long as a material can fix the fixing portion 13A to contact surfaces of the antenna installation plate 12 and the glass sheet 20, and an adhesive or an elastic sealing material can be used, for example. A material forming an adhesive and a sealing material can be publicly known resin such as silicone based resin, polysulfide resin, or acrylic resin. The fixing portion 13A may be a spacer formed by metal such as aluminum, or resin such as AES (acrylonitrile ethylene styrene copolymer). When a spacer is used, a spacer is attached to contact surfaces of the antenna installation plate 12 and the glass sheet 20 by an adhesive such as a silicone sealant for example.

Average thickness t of the fixing portion 13A is from 0.5 to 100 mm preferably. When the average thickness t is too small, thickness of the space S formed by the antenna installation plate 12 and the glass sheet 20 is small (i.e., thin), and air does not flow smoothly in the space S. Note that although thickness of the space S between the antenna installation plate 12 and the glass sheet 20 is thin by making the space S small, the space S can function as a heat insulating layer. Additionally, even if thickness of the space S is small, a certain amount of air can flow. When sunlight shines on the glass sheet 20, the temperature of the glass sheet 20 rises and the temperature of air in the space S also rises. The higher the temperature of air is, the more expanded air is, and air in an upper region of the space S rises and flows outside from the upper side of the space S. Air in a lower region of the space S rises successively. Thus even when thickness of the space S is small, air tends to flow as the temperature of air in the space S rises.

When the average thickness t of the fixing portion 13A is large, the space S is also large (i.e., thick) accordingly, and air flows well in the space S. However, a distance between the main surface of the glass sheet 20 and the antenna installation plate 12 is wide (i.e., large), which may interfere with electromagnetic waves transmission performance. As the antenna unit 10 protrudes from the main surface of the glass sheet 20, the antenna unit 10 becomes an obstacle to the glass sheet 20.

When the average thickness t of the fixing portion 13A is within a range described above, air that flows into the space S can flow through the space S with a small temperature rise. This can prevent the glass sheet 20 from being heated by air that flows in the space S, which can suppress an excessive temperature rise of the first main surface 121 of the antenna installation plate 12.

The average thickness t of the fixing portion 13A is from 2 to 16 mm more preferably, from 4 to 14 mm still more preferably, and from 6 to 12 mm particularly preferably. In order to avoid a thermal breakage, the average thickness t of the fixing portion 13A may be 2 mm or more, 4 mm or more, 6 mm or more, 15 mm or more, 20 mm or more, 30 mm or more, or 50 mm or more. The average thickness t of the fixing portion 13A may be 80 mm or less, 60 mm or less, or 55 mm or less in order to improve a design.

According to the present embodiment, the thickness indicates a length in a direction (the Y-axis direction) perpendicular to the fixing portion 13A with respect to the contact surfaces of the antenna installation plate 12 and the glass sheet 20. According to the present embodiment, the average thickness t of the fixing portion 13A indicates an average value of the thickness of the fixing portion 13A. For example, in the cross section of the fixing portion 13A, when the thickness is measured at several given positions (e.g., about three positions) in the Z-axis direction, the average thickness t indicates an average value of the thickness measured at the given positions.

When the antenna installation plate 12 forms a specific angle with respect to the glass sheet 20 (e.g., the window glass), the fixing portion 13A may be a trapezoid shape in the cross section.

When the antenna installation plate 12 forms a specific angle with regard to the glass sheet 20 (e.g., the window glass), a minimum thickness value of the fixing portion 13A is from 0.5 to 100 mm preferably. The minimum thickness value of the fixing portion 13A may be 2 mm or more, 4 mm or more, 6 mm or more, 15 mm or more, 20 mm or more, 30 mm or more, or 50 mm or more in order to avoid a thermal breakage. The minimum thickness value may be 80 mm or less, 60 mm or less, or 55 mm or less in order to improve a design.

As described above, the space S is formed between the glass sheet 20 and the antenna installation plate 12 by the fixing portion 13A, and is a space where air can flow. Thus, thickness of the space S is almost equal to the average thickness t of the fixing portion 13A.

When the main surface of the glass sheet 20 is in a situation where a heat source is provided near the glass sheet 20 in addition to sunlight for example, an amount of air that flows naturally through the space S may not be sufficient to suppress a temperature rise. In this case, air may be blown into the space S forcibly. An air flow volume per unit area of the antenna installation plate 12 that is blown into the space S (which will hereinafter be simply referred to as an air flow volume) is 2 $m^3/h$ (hour) or more, preferably. An air flow volume that is 2 $m^3/h$ or more can reduce a temperature rise of the main surface of the glass sheet 20 that faces the antenna installation plate 12. The air flow volume is 5 $m^3/h$ or more, more preferably. A maximum air flow volume is not limited, and is 10 $m^3/h$ for example. An air blower can be used as a means to blow air forcibly into the space S, for example.

As described, the antenna unit 10 can reduce average solar absorptance of the first main surface 121 of the antenna installation plate 12 by forming the space S. This can suppress a rise in the surface temperature of the glass sheet 20. The average solar absorptance of the first main surface 121 of the antenna installation plate 12 depends on size of the antenna installation plate 12 and thickness of the space S for example, and is 60% or less preferably, 40% or less more preferably, and 25% or less still more preferably.

According to the present embodiment, the average solar absorptance is an average value of the solar absorptance of the first main surface 121 of the antenna installation plate 12. For example, an average value of the solar absorptance can be obtained by finding an area of a portion where the antenna is provided and a portion where the antenna is not provided, and measuring the solar absorptance at several arbitrary positions (e.g., three positions) for each portion. The solar absorptance can be obtained based on JIS R 3106 (1998).

When the antenna 11 is an antenna formed as a flat plate, the average solar absorptance of the main surface, which faces toward the glass sheet, of the antenna 11 is 60% or less preferably, 40% or less more preferably, and 25% or less still more preferably. When the antenna 11 is provided inside a casing, the average solar absorptance of the main surface, which faces toward the glass sheet, of the casing is 60% or less preferably, 40% or less more preferably, and 25% or less still more preferably.

In the antenna unit 10, air is flowed into the space S from the bottom of the antenna installation plate 12 (i.e., the −Z-axis direction). Air flowed into the space S can flow freely inside the space S toward the top of the antenna installation plate 12 (i.e., the +Z-axis direction). Air that flows in the space S flows outside from the top of the antenna installation plate 12 (i.e., the +Z-axis direction) with contacting the main surface of the glass sheet 20 facing the antenna installation plate 12. An excessive temperature rise of the main surface of the glass sheet 20 facing the antenna installation plate 12 caused by outside air and sunlight for example, can be suppressed by air in the space S contacting the main surface of the glass sheet 20 facing the antenna installation plate 12. As the fixing portions 13A are formed continuously in the vertical direction, the temperature difference between an upper area and a lower area of the space S increases accordingly. As a result, what is called chimney effect can increase a flow rate of air that flows in the space S.

The antenna unit 10 provides the fixing portion 13A on the antenna installation plate 12 so as to form the space S where air can flow between the glass sheet 20 and the antenna installation plate 12. This can suppress an excessive temperature rise of the main surface of the glass sheet 20 facing the antenna installation plate 12 even if the glass sheet 20 is heated by outside air and sunlight for example. This can decrease a possibility to cause a thermal breakage of the glass sheet 20 facing the antenna installation plate 12. As a result, the antenna unit 10 can be installed on the glass sheet 20 in a stable condition without causing damage to the glass sheet 20.

In the following, another embodiment of the antenna unit 10 will be described.

Figure 4:
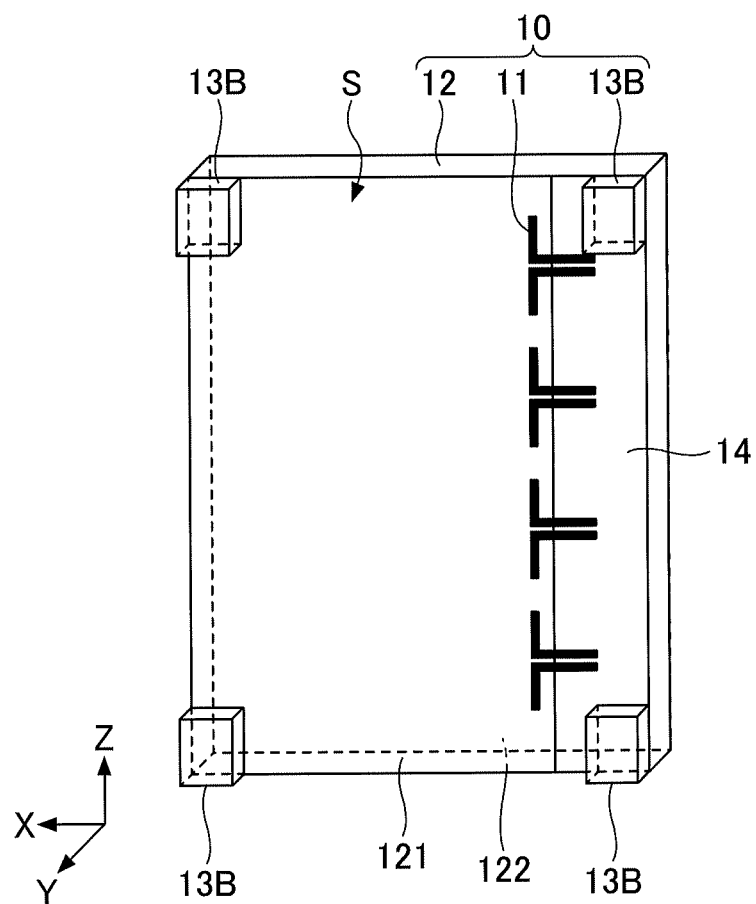
FIG. 4 is a perspective view illustrating an example of another embodiment of a fixing portion.

The embodiment in which the fixing portions 13A are provided in two positions of the antenna installation plate 12 is described above, but an embodiment of the fixing portions 13A is not limited as long as air can flow in the space S. FIG. 4 illustrates an example of another embodiment of the fixing portions 13A. FIG. 4 is a perspective view illustrating the example of another embodiment of the fixing portions 13A. As illustrated in FIG. 4, fixing portions 13B may be provided at both ends of the first main surface of the antenna installation plate 12 in the X-axis direction and at both ends in the Z-axis direction, and fix the antenna installation plate 12 by four positions. Two fixing portions provided in the −Z-axis direction among the four fixing portions 13B may be decreased to one fixing portion near the center of the lower part of the antenna installation plate 12, and the antenna installation plate 12 may be fixed to the glass sheet 20 by three fixing portions 13B. The four fixing portions 13B may be decreased to two diagonal fixing portions, and the antenna installation plate 12 may be fixed to the glass sheet 20 by two fixing portions 13B.

The fixing portion may be provided on an entire side of the antenna installation plate 12 as illustrated in FIG. 3, or may be provided on a part of the side of the antenna installation plate 12 as illustrated in FIG. 4.

In FIG. 3, the fixing portions 13A are provided in a rectangle shape along the Z-axis direction on the both ends of the antenna installation plate 12 in the X-axis direction, but may be provided on three positions among the both ends in the X-axis direction and the Z-axis direction of the antenna installation plate 12, as long as air can flow in the space S. When the fixing portions 13A are provided on three positions, for example, air can flow in the space S by blowing air through the space S forcibly by an air blower. When the fixing portions are provided in a frame shape along four sides of the antenna installation plate 12, air cannot flow in the space S, but embodiments described above enable air to flow in the space S.

Figure 5:
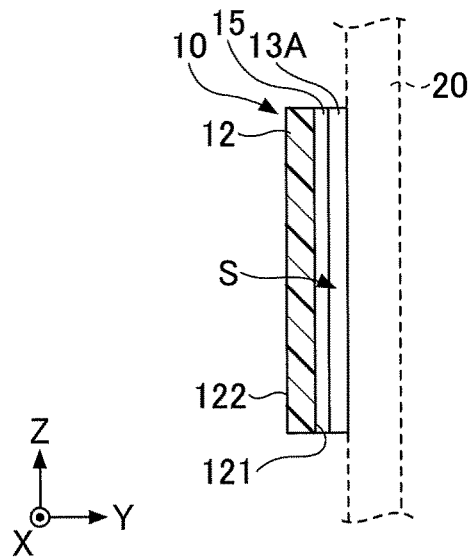
FIG. 5 is a cross-sectional view illustrating an example of another embodiment of an antenna unit for glass.

According to the present embodiment, the antenna unit 10 forms only the space S between the glass sheet 20 and the first main surface of the antenna installation plate 12, but it is not limited to this. FIG. 5 illustrates a cross-sectional state of an example of another embodiment of the antenna unit. As illustrated in FIG. 5, the antenna unit 10 may further include a dielectric layer 15 on the first main surface 121, which faces toward the glass sheet, of the antenna installation plate 12. Even in this case, the space S is formed between the glass sheet 20 and the dielectric layer 15. The dielectric layer 15 may cover an entire plane of the first main surface 121, or cover only a part of the antenna installation plate 12. The dielectric layer 15 is provided on the first main surface 121 of the antenna installation plate 12, which can increase electromagnetic waves transmission performance. The dielectric layer 15 may be a single layer or multiple layers.

The dielectric layer 15 preferably has a relative permittivity between the antenna installation plate 12 and the space S, and a relative permittivity of the dielectric layer 15 is, for example, 5.0 or less preferably, 3.5 or less more preferably. A material forming the dielectric layer 15 may be any material that has a relative permittivity between the antenna installation plate 12 and the space S, such as acrylic resin(or methacrylic resin), polycarbonate resin, polyvinyl chloride resin, fluorine resin, or fiber reinforced plastic (FRP). The dielectric layer 15 can be formed by a publicly known method such as a method of attaching by an adhesive.

Thickness of the dielectric layer 15 is, for example, from 0.2 to 1.5 mm preferably, from 0.3 to 1.3 mm more preferably, from 0.7 to 1.2 mm still more preferably so that the dielectric layer 15 can be placed between the glass sheet 20 and the antenna installation plate 12. In this case, the fixing portion 13A is from 0.7 to 100 mm so as to form the space S.

When the dielectric layer 15 is provided on the first main surface 121 of the antenna installation plate 12, the arithmetic average roughness Ra of the dielectric layer 15 is preferably similar to the arithmetic average roughness of the first main surface 121 of the antenna installation plate 12. A maximum value of the arithmetic average roughness of the dielectric layer 15 is 1.2 μm or less preferably, 0.6 μm or less more preferably, 0.3 μm or less still more preferably. A minimum value of the arithmetic average roughness of the dielectric layer is not particularly limited, and is 0.001 μm or more preferably. In this case, the arithmetic average roughness of the first main surface 121 of the glass sheet 20 is not particularly limited.

Figure 6:
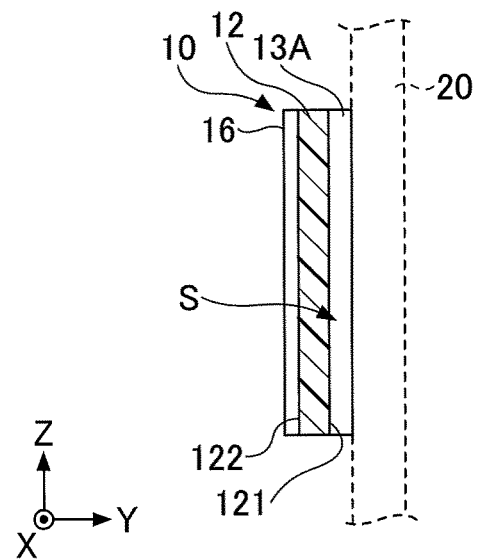
FIG. 6 is a cross-sectional view illustrating an example of another embodiment of an antenna unit for glass.

According to the present embodiment, as illustrated in FIG. 6, the antenna unit 10 may include an electromagnetic shielding layer 16 provided on the second main surface 122, which faces a direction opposite to the glass sheet 20, of the antenna installation plate 12. The electromagnetic shielding layer 16 can reduce electromagnetic interference between the electromagnetic waves and electromagnetic waves transmitted from indoor electronic devices. The electromagnetic shielding layer 16 may be a single layer or multi layers. The electromagnetic shielding layer 16 may be a publicly known material such as a metal film of copper or tungsten, or a transparent substrate using a transparent conductive film.

As the transparent conductive film, indium tin oxide (ITO), fluorine doped tin oxide (FTO), indium zinc oxide (IZO), indium tin oxide silicon oxide (ITSO), zinc oxide (ZnO), or a conductive material that has optical transparency such as an Si compound including P or B can be used.

The electromagnetic shielding layer 16 is preferred to be formed in a mesh shape in order to have a light transparency. A mesh shape is a state in which net-like through holes are formed on a plane of the electromagnetic shielding layer 16. When the electromagnetic shielding layer 16 is formed in a mesh shape, a cell shape of a mesh may be a square or a diamond shape. A line width of a mesh is from 5 to 30 μm preferably, and is from 6 to 15 μm more preferably. A space between lines of a mesh is from 50 to 500 μm preferably, and is from 100 to 300 μm more preferably.

A method of forming the electromagnetic shielding layer 16 may be a publicly known method such as a sputtering method and a vapor deposition method.

The surface resistivity of the electromagnetic shielding layer 16 is 20Ω/□ or less preferably, 10Ω/□ or less more preferably, 5Ω/□ or less still more preferably. The size of the electromagnetic shielding layer 16 is greater than or equal to the antenna installation plate 12 preferably. Providing the electromagnetic shielding layer 16 on the second main surface 122 of the antenna installation plate 12 can suppress transmission of radio waves into a room. The surface resistivity of the electromagnetic shielding layer 16 depends on thickness, a material, and an aperture ratio of the electromagnetic shielding layer 16. The aperture ratio is a ratio of an area of an opening portion per area of the electromagnetic shielding layer 16 including an opening portion.

The visible light transmittance of the electromagnetic shielding layer 16 is 40% or more, preferably, 60% or more, more preferably. The visible light transmittance of the electromagnetic shielding layer 16 is 90% or less preferably, 80% or less more preferably in order to suppress transmission of radio waves into a room.

The more an aperture ratio of the electromagnetic shielding layer 16 is, the more the visible light transmittance is. The aperture ratio of the electromagnetic shielding layer 16 is 80% or more preferably, 90% or more, more preferably. The aperture ratio of the electromagnetic shielding layer 16 is 95% or less preferably in order to suppress transmission of radio waves into a room.

Thickness of the electromagnetic shielding layer 16 is 400 nm or less preferably, 300 nm or less more preferably. A minimum thickness of the electromagnetic shielding layer 16 is not particularly limited, and may be 2 nm or more, 10 nm or more, or 30 nm or more.

When the electromagnetic shielding layer 16 is formed in a mesh shape, thickness of the electromagnetic shielding layer 16 may be from 2 to 40 μm. The visible light transmittance can be high by forming the electromagnetic shielding layer 16 in a mesh shape although the electromagnetic shielding layer 16 is thick.

The electromagnetic shielding layer 16 is not limited to an example in which the electromagnetic shielding layer 16 is provided on the second main surface. For example, the antenna unit 10 sets a tilt angle in a direction that forms an angle with respect to a normal direction of the surface of the antenna unit 10 (i.e., the +Y-axis direction). In this case, a part of radiated electromagnetic waves is reflected at a boundary surface between the glass sheet 20 and an outside of a room with forming an angle with respect to a normal direction of the boundary surface (e.g., the −Y-axis direction). For example, reflected waves forming an angle with respect to the −Y-axis direction can be transmitted to an inside of a room from a region that is different from a region where the antenna unit 10 is provided in a surface of the indoor side (i.e., the −Y-axis direction) of the glass sheet 20. In order to prevent such reflected waves from being transmitted to an inside of a room, the electromagnetic shielding layer 16 may be provided in a different region on the indoor side of the glass sheet 20 from a region where the antenna unit 10 is provided. For example, the electromagnetic shielding layer 16 may be provided in a region on the indoor side of the glass sheet 20 shifted in the +Z-axis direction and/or the −Z-axis direction from a region where the antenna unit 10 is provided. A position and/or a region in which the electromagnetic shielding layer 16 is provided to the glass sheet 20 may be determined in accordance with a height where the antenna unit 10 is provided, an area where the antenna unit 10 is formed, or a radiation direction (e.g., a tilt angle) of the antenna unit 10, or any combination thereof.

When the electromagnetic shielding layer 16 is provided on the indoor side of the glass sheet 20, a space similar to the space S may be formed between the glass sheet 20 and the electromagnetic shielding layer 16.

Instead of the electromagnetic shielding layer 16, a structure that suppresses transmission of electromagnetic waves into a room with maintaining optical transparency may be provided on the second main surface 122. For example, one or more electromagnetic wave absorption elements may be provided on the second main surface 122. The electromagnetic wave absorption element includes a structure in which a metal is formed in a line shape (or a long shape) for example.

The electromagnetic wave absorption element is not limited to a metal, and may be a material in which multiple raw materials are blended. For example, the multiple raw materials may be a metal, an alloy, carbon, and/or various organic substances, and conductivity of the multiple raw materials may be different respectively. The electromagnetic wave absorption element may be formed by a material with optical transparency.

For example, the multiple electromagnetic wave absorption elements may be arranged on the second main surface 122, such that the multiple electromagnetic wave absorption elements are oriented in the same direction with respect to a longitudinal direction of each element, and are arranged at a predetermined interval in a direction orthogonal to the longitudinal direction. For example, the multiple electromagnetic wave absorption elements may be arranged, such that the longitudinal direction of the multiple electromagnetic wave absorption elements is along a direction of polarization planes of electromagnetic waves radiated from the antenna unit 10.

The electromagnetic wave absorption elements are not limited to an example in which the electromagnetic wave absorption elements are provided on the second main surface 122, and for example, the electromagnetic wave absorption elements may be provided on an area of the indoor side of the glass sheet 20 that is different from an area where the antenna unit 10 is provided. A position and/or a range in which the electromagnetic wave absorption elements are provided may be determined in accordance with a height where the antenna unit 10 is provided, an area where the antenna unit 10 is formed, or a radiation direction (e.g., a tilt angle) of the antenna unit 10, or any combination thereof.

According to the present embodiment, the antenna unit 10 is attached to the glass sheet 20 in a state where the antenna installation plate 12 and the fixing portions 13A are integrated, but the present embodiment is not limited to this. For example, after only the fixing portions 13A are attached on the glass sheet 20 in advance, the antenna installation plate 12 may be attached to the fixing portion 13A, and the antenna unit 10 may be built on the glass sheet 20.

<A Glass Sheet with Antennas>

Figure 7:
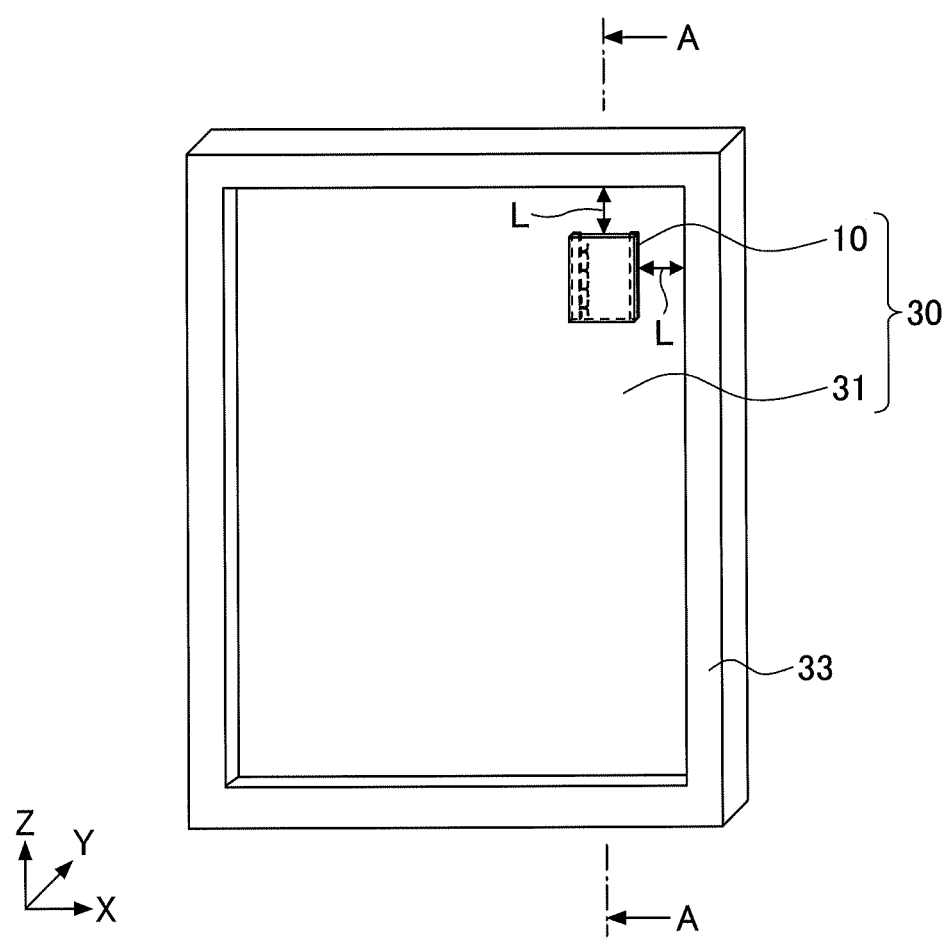
FIG. 7 is a perspective view illustrating a glass sheet with an antenna.
Figure 8:
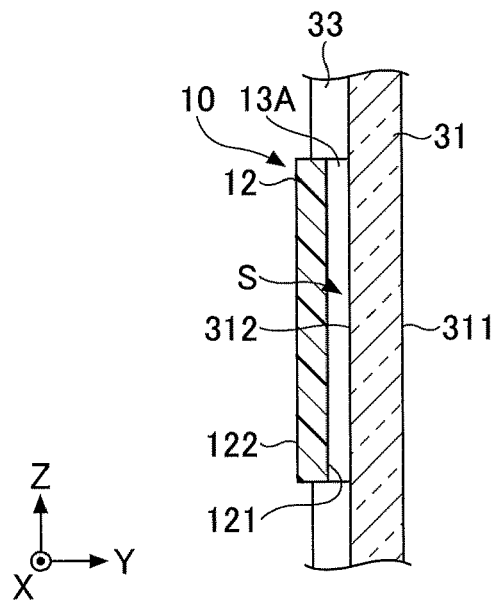
FIG. 8 is a partial cross-sectional view taken from the line A-A in FIG. 7.

A glass sheet with antennas to which the antenna unit for glass according to embodiments is applied, will be described. FIG. 7 is a perspective view illustrating a glass sheet with an antenna, and FIG. 8 is a partial cross-sectional view taken from the line A-A in FIG. 7. As illustrated in FIG. 7 and FIG. 8, a glass sheet with an antenna 30 includes the antenna unit 10 described above and a glass sheet 31, and the antenna unit 10 is attached on the glass sheet 31.

The glass sheet 31 is a publicly known glass sheet, such as a glass sheet used for a window of a building. In plane view, the glass sheet 31 illustrated in FIG. 7 and FIG. 8 is formed as a rectangle and includes a first main surface 311 and a second main surface 312. Thickness of the glass sheet 31 is configured based on building requirements, for example. According to the present embodiment, the first main surface of the glass sheet 31 is an outdoor side, and the second main surface is an indoor side. In the present embodiment, both the first main surface 311 and the second main surface 312 may be simply referred to as the main surfaces. In the present embodiment, a rectangle includes a shape with rounded corners of a rectangle and a square, in addition to a rectangle and a square. A shape of the glass sheet 31 in plane view is not limited to a rectangle, and may be a circle, for example. The glass sheet 31 is not limited to a single pane, and may be a laminated glass or an insulating glass unit.

A material of the glass sheet 31 can be soda-lime-silica glass, borosilicate glass, aluminosilicate glass, or alkali-free glass, for example.

The glass sheet 31 can be produced by a publicly known production method, such as a float method, a fusion method, a redraw method, a press forming method, or a lifting method. A float method is preferable for a production method of the glass sheet 31 with respect to better productivity and cost.

In plane view, the glass sheet 31 is formed as a rectangle for example. A cutting method of the glass sheet 31 can be a method of cutting by emitting a laser light to a surface of the glass sheet 31 and moving an area illuminated by a laser light on a surface of the glass sheet 31, or a method of cutting mechanically by using a cutter wheel, for example.

The glass sheet 31 is maintained in a state that an outer edge of the glass sheet 31 is held by a window frame 33. The glass sheet 31 may be held by the window frame 33, by using an adhesive on the outer edge of the glass sheet 31. As a material forming the window frame 33, a publicly known material can be used, and a metal material such as stainless steel and aluminum can be used.

In plane view, the antenna unit 10 is provided at a position that is a predetermined length L or more away from the window frame 33 preferably. The predetermined length L is 20 mm preferably. For example, when the window glass is directly exposed to sunlight, the temperature of the glass sheet 31 rises and is high. As the window frame 33 is at a lower temperature than the glass sheet 31, the glass sheet located inside the window frame 33 becomes at a lower temperature by the window frame 33. A portion of the glass sheet 31 that faces the antenna unit 10 is a higher temperature than the glass sheet 31 located inside the window frame 33. This causes a big difference in thermal expansion between the portion of the glass sheet 31 that faces the antenna unit 10 and the glass sheet 31 located inside the window frame 33, and a big thermal stress is caused on the portion of the glass sheet 31 that faces the antenna unit 10. According to circumstances, a thermal breakage may occur at or near the portion of the glass sheet 31 that faces the antenna unit 10. Especially, the antenna unit 10 is attached to the second main surface 312 of the glass sheet 31, which blocks an air flow on the second main surface 312 of the glass sheet 31. In this case, the temperature of the portion of the glass sheet 31 that faces the antenna unit 10 is higher. As a result, the thermal stress, which occurs at or near the portion of the glass sheet 31 that faces the antenna unit 10, may be greater.

Figure 9:
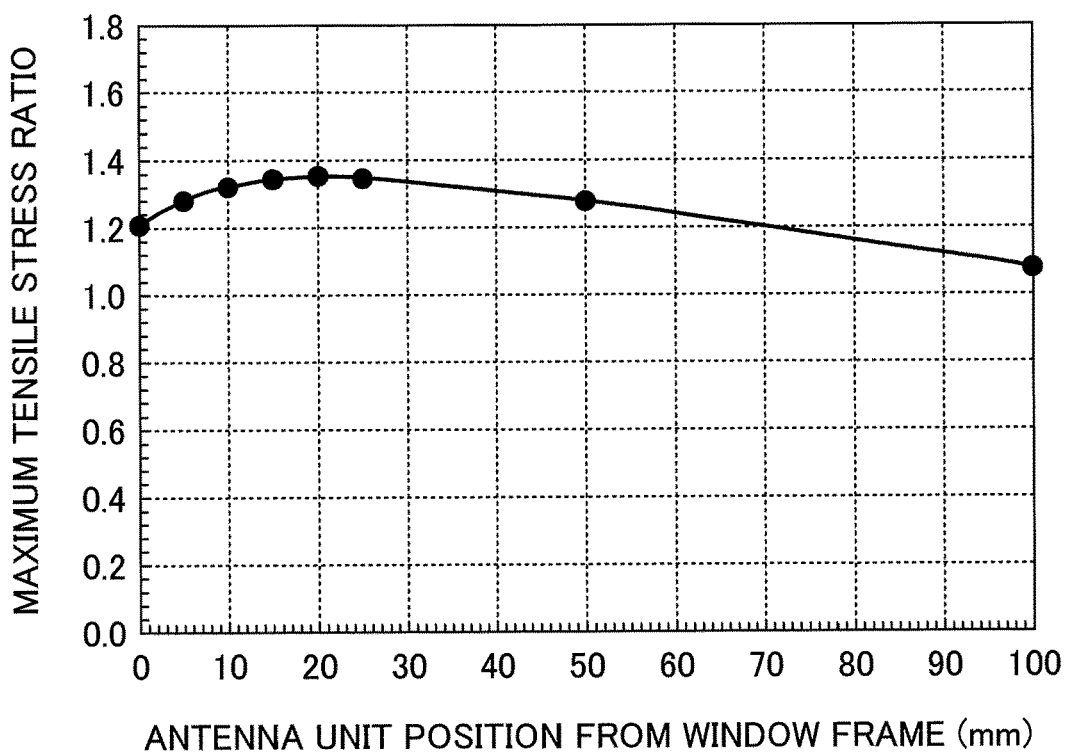
FIG. 9 is a drawing illustrating a relationship between a position of an antenna unit from an inner side of a window frame and a maximum tensile stress ratio.

FIG. 9 illustrates an example of a relationship between a position where the antenna unit 10 is provided from an inner side of the window frame and a stress generated on the glass sheet 31 (i.e., a maximum tensile stress). In FIG. 9, the size of the antenna unit 10 is 400 mm width (the X-axis direction) by 400 mm height (the Z-axis direction). The average solar absorptance of the antenna installation plate 12 is about 90%. The glass sheet 31 is FL-8 (manufactured by AGC Inc.). The maximum tensile stress generated on the glass sheet 31 is evaluated by a ratio between the maximum tensile stress generated on a portion of the glass sheet 31 where the antenna unit 10 is attached and the maximum tensile stress generated on a portion of the glass sheet 31 where the antenna unit 10 is not attached (i.e., a maximum tensile stress ratio). The vertical axis in FIG. 9 indicates the maximum tensile stress ratio of the glass sheet 31. The horizontal axis in FIG. 9 indicates a length between the inner side of the window frame 33 and the antenna unit 10.

As described in FIG. 9, when the antenna unit 10 is about 20 mm away from the inner side of the window frame 33, the maximum tensile stress ratio is largest (i.e., about 1.4), and a thermal stress generated on the glass sheet 31 is largest. The maximum tensile stress ratio tends to decrease as an installation position of the antenna unit 10 moves more than 20 mm away from the inner side of the window frame 33. Consequently, when the antenna unit 10 is installed at a position more than 20 mm away from the inner side of the window frame 33, a thermal stress generated on the glass sheet 31 is small. The antenna unit 10 is preferably more than 20 mm away from the inner side of the window frame 33 as the antenna unit 10 is away from the window frame 33 and is installed easily.

According to the present embodiment, the antenna unit 10 is provided at the position 20 mm or more away from the window frame 33, which can decrease a temperature gradient between a portion of the glass sheet 31 facing the antenna unit 10 and a portion of the glass sheet 31 inside the window frame 33. Furthermore, it causes an air flow in the space S formed between the antenna installation plate 12 of the antenna unit 10 and the glass sheet 31. By this, a temperature gradient of a portion of the glass sheet 31 facing the antenna unit 10 and a portion of the glass sheet 31 inside the window frame 33 can be smaller.

The predetermined length L is 25 mm, more preferably, 30 mm still more preferably, 40 mm particularly preferably, and 50 mm most preferably. Thus, in plane view, the antenna unit 10 is provided at a position 25 mm or more away from the window frame 33 more preferably, 30 mm or more away still more preferably, 40 mm or more particularly preferably, and 50 mm or more most preferably.

The glass sheet with the antenna 30 includes the antenna unit 10, which can decrease a possibility of causing a thermal breakage on a portion of the glass sheet 31 facing the antenna unit 10. Thus, the glass sheet with the antenna 30 can be suitably used as a glass sheet for a window glass of an existing or new building or house for example.

The glass sheet with the antenna 30 can provide the antenna unit 10 on the second main surface 312, which is the indoor side of the glass sheet 31. This can prevent the antenna unit 10 from damaging an appearance of a building, and can prevent the antenna unit 10 from being exposed to outside air, which can improve durability. Furthermore, the glass sheet with the antenna 30 provides the antenna unit 10 on the upper side of the glass sheet 31 and either the left end or the right end of the glass sheet 31. Consequently, wires connected to the antenna installation plate 12 of the antenna unit 10 can be routed in a ceiling and a wall from the glass sheet 31, which can reduce unhidden wires on the glass sheet 20 and an indoor wall of a building.

The glass sheet with the antenna 30 provides the antenna unit 10 on the glass sheet 31, and it is not necessary to provide the antenna unit 10 on a roof of a building for example. Thus, the glass sheet with the antenna 30 does not require an installation work at a high place such as a roof of a building, and can be installed in a building easily. Additionally, for example, when the antenna unit 10 is broken and is needed to be exchanged, the antenna unit 10 can be easily exchanged in a short time.

The glass sheet with the antenna 30 can provide multiple antenna units 10 on the glass sheet 31. Even in this case, as the antenna units 10 are provided on the second main surface 312, which is the indoor side of the glass sheet 31, the glass sheet with the antenna 30 can reduce damage to an appearance of a building although the multiple antenna units 10 are provided on the glass sheet 31. Additionally, the glass sheet with the antenna 30 can stably transmit and receive electromagnetic waves by the multiple antenna units 10 provided on the glass sheet 31.

The antenna can be installed inside a building as the antenna has been downsized. When the antenna is installed in a building, the antenna is installed by selecting an appropriate place for an installation so that electromagnetic waves can be stably transmitted and received, while an appearance of a building is not damaged.

In order to increase speed and capacity of wireless communication, a frequency band to be used has been higher and wider like a frequency band for the fifth generation mobile communication system (5G). For this reason, when electromagnetic waves having a frequency band of a high frequency and a wide band are used for mobile phones and Internet communications, it is important to install more antennas than before so that electromagnetic waves can be stably transmitted and received. The 5G frequency band indicates from 3.6 to 29.5 GHz frequency that includes a 3.7 GHz band (from 3.6 to 4.2 GHz), a 4.5 GHz band (from 4.4 to 4.9 GHz), and a 28 GHz band (from 27.5 to 29.5 GHz).

According to the present embodiment, the glass sheet with the antenna 30 can stably transmit and receive electromagnetic waves while reducing damage to an appearance of a building by providing the multiple antenna units 10 on the glass sheet 31. This enables electromagnetic waves having a frequency band of a high frequency and a wide band to be stably transmitted and received, and higher speed and larger capacity of wireless communication can be supported.

Another Embodiment

In the following, another embodiment of the glass sheet with the antenna 30 will be described.

Figure 10:
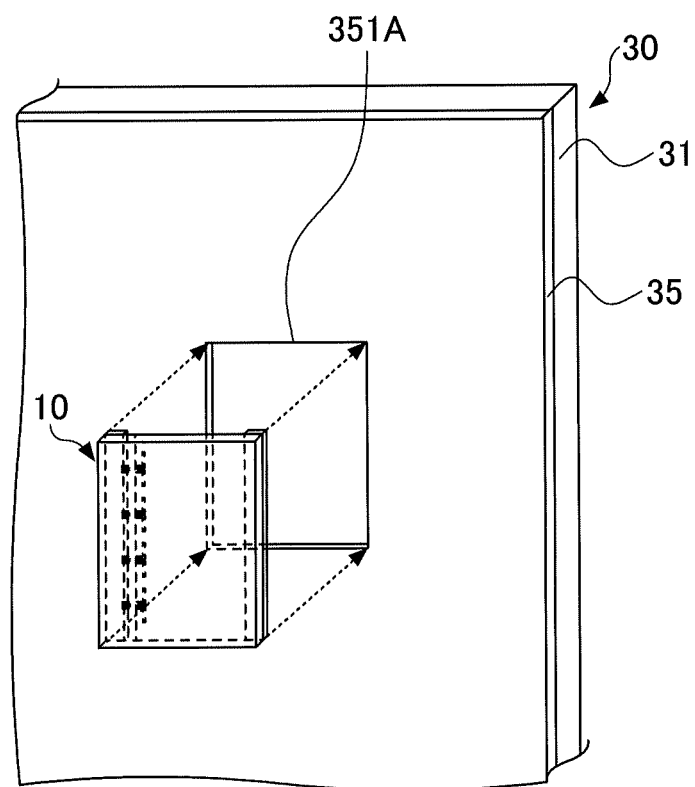
FIG. 10 is a drawing illustrating an example of a state in which an opening portion is formed in a coating layer.

According to the present embodiment, as illustrated in FIG. 10, the glass sheet with the antenna 30 may provide a coating layer 35, which has a heat reflecting function for example, on the second main surface 312, which is the indoor side of the glass sheet 31. In this case, the coating layer 35 preferably includes an opening portion 351A at a position facing the antenna installation plate 12 of the antenna unit 10 or the antenna formed as a flat plate. This enables the glass sheet with the antenna 30 to suppress degradation of radio wave transmission performance.

The opening portion 351A is preferably the same size of the antenna installation plate 12 or the antenna formed as a flat plate at least.

When an antenna is provided inside a casing, the coating layer 35 preferably includes the opening portion 351A at a position facing the casing of the antenna unit 10, and the opening portion 351A is preferably the same size of the casing at least.

As the coating layer 35, a conductive film can be used for example. As a conductive film, a laminated film that laminates a transparent dielectric, a metal film, and a transparent dielectric sequentially, ITO, or fluorine doped tin oxide (FTO) can be used, for example. As a metal film, a film in which a main component is at least one selected from a group including Ag, Au, Cu, and Al can be used, for example.

An area of the opening portion 351A is preferably equal to or more than a value obtained by the following expression (1). This enables the glass sheet with the antenna 30 to suppress degradation of radio wave transmission performance.

$$a \times b \qquad (1)$$

(In the expression (1), a variable a is a length of one side of the antenna installation plate 12, the antenna in a flat plate, or the casing, and a variable b is a length of the other side of the antenna installation plate 12, the antenna in a flat plate, or the casing.)

The variables a and b in the expression (1) above are described for a case in which the antenna installation plate 12, the antenna in a flat plate, or the casing is a rectangle in plane view, but the present embodiment is not limited to this. When the antenna installation plate 12 is a circle in plane view, the variables a and b in the expression (1) above can be a diameter of the antenna installation plate 12, the antenna in a flat plate, or the casing, and can be the same value. When the antenna installation plate 12 is an ellipse in plane view, the variable a in the expression (1) above can be a minor axis of the antenna installation plate 12, the antenna in a flat plate, or the casing, and the variable b can be a major axis.

When the antenna 11 is provided inside the antenna installation plate 12, similarly as described above, the variable a in the expression (1) above is a length of one side of the antenna installation plate 12, and the variable b is a length of the other side of the antenna installation plate 12. Similarly, when the antenna 11 is provided inside a casing having a plane parallel to the glass sheet 20, the variable a in the expression (1) above is a length of one side of the casing, and the variable b is a length of the other side of the casing. When the antenna 11 is formed as a flat plate, the variable a in the expression (1) above is a length of one side of the antenna formed as a flat plate, and the variable b is a length of the other side of the antenna formed as a flat plate.

Figure 11:
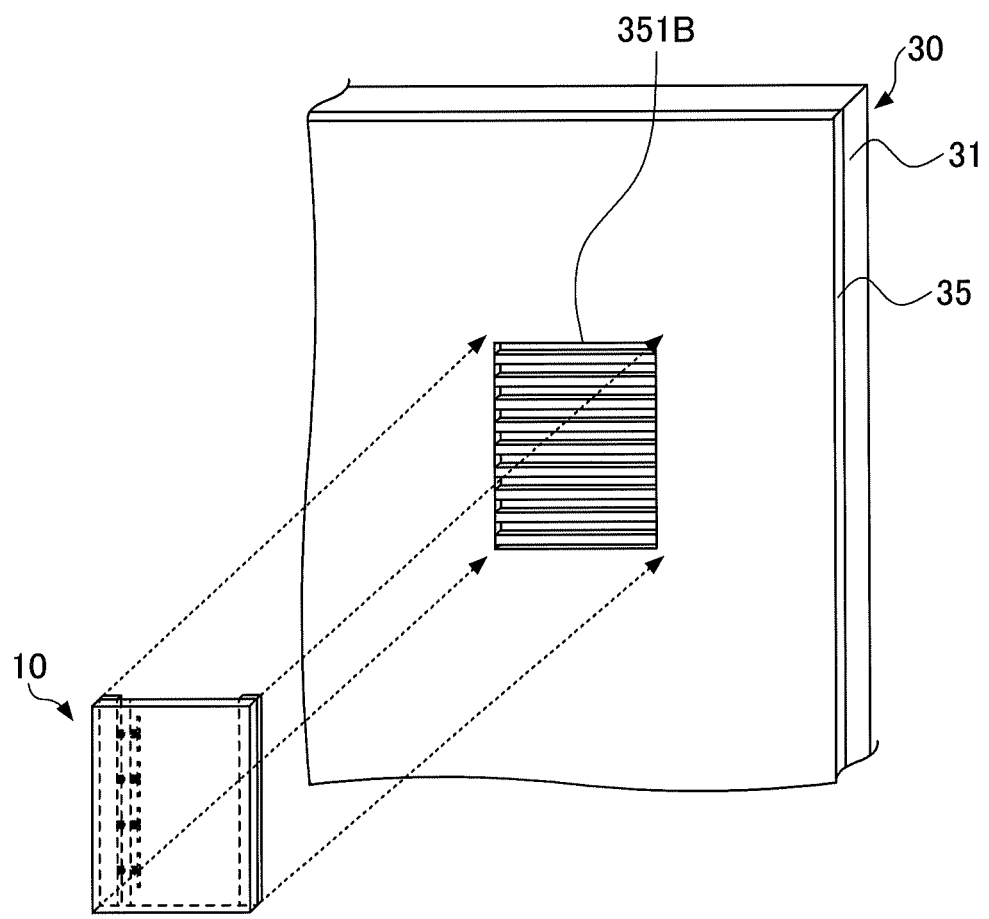
FIG. 11 is a drawing illustrating another example of a state in which an opening portion is formed in a coating layer.

The opening portion 351A is a size corresponding to the antenna unit 10, but a part of the opening portion 351A may be remained. FIG. 11 illustrates an example of another embodiment of the opening portion 351A. As illustrated in FIG. 11, the coating layer 35 may include an opening portion 351B formed in a slit shape. In this case also, the glass sheet with the antenna 30 can suppress degradation of radio wave transmission performance. The size of the opening portion 351B is formed such that the fixing portions of the antenna unit 10 are arranged on an outer side of the opening portion 351B.

A width of the slit-shaped opening portion 351B is preferably $\lambda/200$ or more. The slit-shaped opening portion 351B is not necessary to be a periodic structure, and an interval between opening portions of the slit-shaped opening portion 351B is preferably $\lambda/2$ or less. The slit-shaped opening portion 351B is preferably formed in a direction orthogonal to a direction of an electric field in electromagnetic wave. This enables the glass sheet with the antenna 30 to suppress degradation of radio wave transmission performance more stably. When both horizontally polarized electromagnetic waves and horizontally polarized electromagnetic waves are used, the opening portion 351B is preferably formed in a lattice shape. This enables the glass sheet with the antenna 30 to suppress degradation of radio wave transmission performance more stably. When the coating layer 35 is removed in an indefinite shape, intervals between opening portions of the slit-shaped opening portion 351B are not repeated with λ/2 in a direction of an electric field preferably. This enables the glass sheet with the antenna 30 to suppress degradation of radio wave transmission performance stably.

Figure 12:
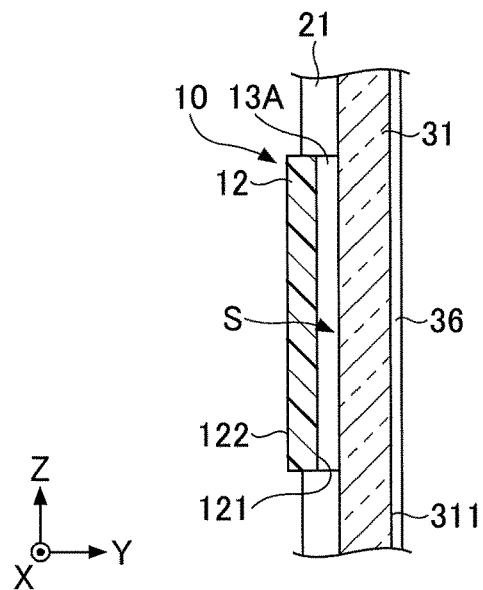
FIG. 12 is a partial cross-sectional view illustrating an example of another embodiment of a glass sheet with an antenna.

As illustrated in FIG. 12, the glass sheet with the antenna 30 may include a water-repellent layer 36 on the first main surface 311 of the glass sheet 31, which is the side opposite to the antenna unit 10 (i.e., the outdoor side). The water-repellent layer 36 provided on the first main surface 311 can improve radio wave transmission performance.

<An Installation Method and Production Method of the Antenna Unit for Glass>

An installation method and production method of the antenna unit for glass according to one embodiment will be described. An installation method and production method of the antenna unit for glass described here can be applied to a window glass (i.e., a glass sheet) of a building after construction and a window glass (i.e., a glass sheet) of a new building under construction.

First, an installation place is checked to install the antenna unit 10 on a window glass of a building. For checking an installation place, after a kind of glass is selected and an orientation of an installation place is checked, a radio property of a window glass 40 of a building is checked, for example. By checking an installation place, a position where the fixing portions 13A are attached or thickness of the fixing portions 13A (i.e., thickness of the space S) is determined, for example.

Figure 13:
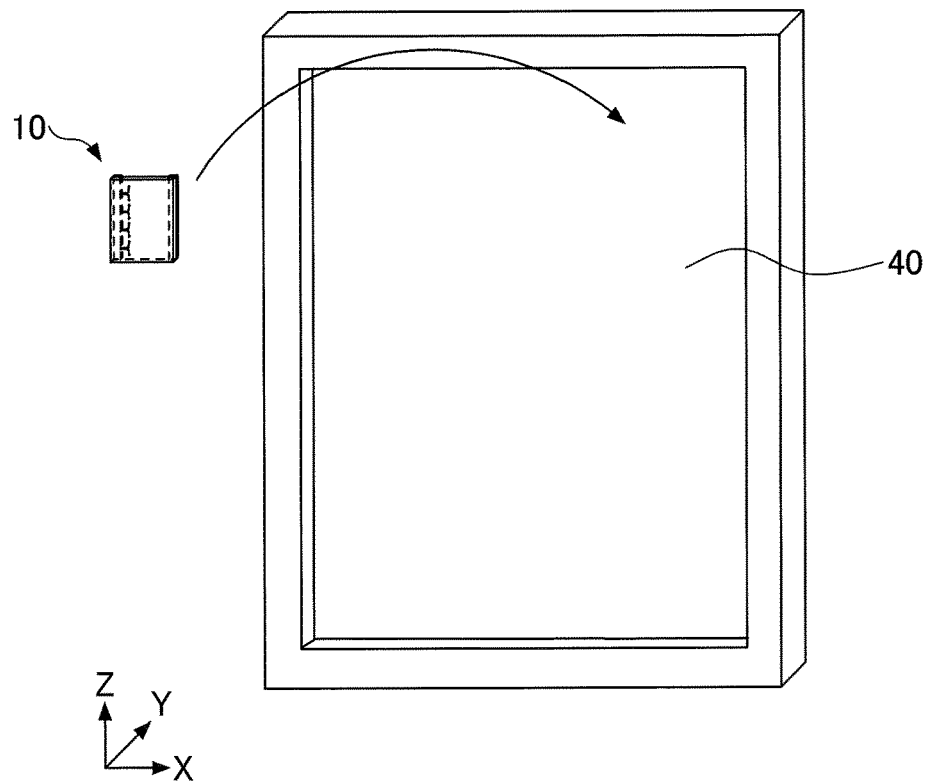
FIG. 13 is a drawing illustrating a part of a procedure of an installation method of an antenna unit for glass.

Next, as illustrated in FIG. 13, the antenna unit 10 is attached to the window glass 40 by the fixing portion 13A such that the space S where air can flow is formed between the window glass 40 and the antenna installation plate 12.

As a result, the antenna unit 10 illustrated in FIG. 2 can be installed on the window glass 40 of an existing building.

Additionally, the installation method and production method of the antenna unit 10 can be applied to the glass sheet 31 providing the coating layer 35 (which is illustrated in FIG. 10), which has a heat reflecting function for example, on the second main surface 312, which is the indoor side of the glass sheet 31. In this case, as illustrated in FIG. 10 and FIG. 11, a portion of the coating layer 35 that is corresponding to the antenna installation plate 12 of the antenna unit 10 is removed at least. The opening portion 351A as illustrated in FIG. 10 or the slit-shaped opening portion 351B as illustrated in FIG. 11 is preferably formed. By this, the opening portion 351A or the opening portion 351B is the same size of the antenna unit 10 at least, which enables the glass sheet with the antenna 30 to suppress degradation of radio wave transmission performance.

A timing to form the opening portion 351A and the opening portion 351B is not particularly limited, and for example, the opening portion 351A and the opening portion 351B are preferably formed before the antenna unit 10 is attached to the window glass 40 of a building with respect to ease of forming the opening portion 351A and the opening portion 351B.

The coating layer 35 can be removed by a publicly known method, such as polishing or laser.

As described above, the opening portion 351A and the opening portion 351B are preferably formed such that an area of the opening portion 351A and the opening portion 351B is equal to or more than a value of the expression (1) above. This enables the glass sheet with the antenna 30 to suppress degradation of radio wave transmission performance.

<A Production Method of the Glass Sheet with the Antenna>

In the following, a production method of the glass sheet with the antenna will be described. First, the antenna unit 10 and a glass sheet 31 in a rectangle forming main surfaces are prepared. The glass sheet 31 can be formed as a rectangle in plane view by using a publicly known cutting method for cutting a glass raw plate produced by a publicly known production method.

Subsequently, the antenna unit 10 is attached to the glass sheet 31 by the fixing portion 13A such that the space S where air can flow is formed between the glass sheet 31 and the antenna installation plate 12.

By this, the glass sheet with the antenna 30 as illustrated in FIG. 7 can be produced.

Additionally, the coating layer 35 (illustrated in FIG. 10) can be provided on the second main surface 312 on the glass sheet 31. In this case, the opening portion 351A as illustrated in FIG. 10 or the slit-shaped opening portion 351B as illustrated in FIG. 11 is preferably formed at a position of the coating layer 35 facing the antenna installation plate 12 of the antenna unit 10.

An Example of the Embodiment

In the following, an example in which an antenna unit is produced and a glass sheet with an antenna is evaluated in the following conditions will be described. The example 1-1 to the example 1-14 are examples of embodiments, and the example 1-15 to the example 1-17 are reference examples.

Example 1

Example 1-1

The size of the antenna installation plate 12 (See FIG. 2) of the antenna unit 10 is 400 mm width (the X-axis direction) by 400 mm height (the Z-axis direction), and average thickness of the fixing portion 13A (See FIG. 2) is 1.0 mm, and the space S (See FIG. 2) is formed so that air can flow in the space S naturally. This produces the glass sheet with the antenna 30 illustrated in FIG. 7. The antenna installation plates 12 (See FIG. 2) whose first main surfaces 121 have 20%, 40%, 60% and 90% average solar absorptance are prepared. The amount of sunlight shining on the glass sheet with the antenna 30 is 825 W/m$^2$, and the outside temperature of the building where the glass sheet with the antenna 30 is installed is about 5° C., the indoor temperature is about 20° C., heat transfer coefficient of the outer side of the building is 15.1 W/m$^2$k, heat transfer coefficient of the inner side of the building is 8.0 W/m$^2$k, and the temperature of the window frame 33 of the glass sheet with the antenna 30 is about 10.2° C. For each plate accommodating an antenna, the temperature of the second main surface 312 that faces toward the antenna installation plate 12, an air flow volume which flows in the space S per unit area of the antenna installation plate 12, and a stress generated on an edge of the glass sheet 31 are measured.

Figure 14:
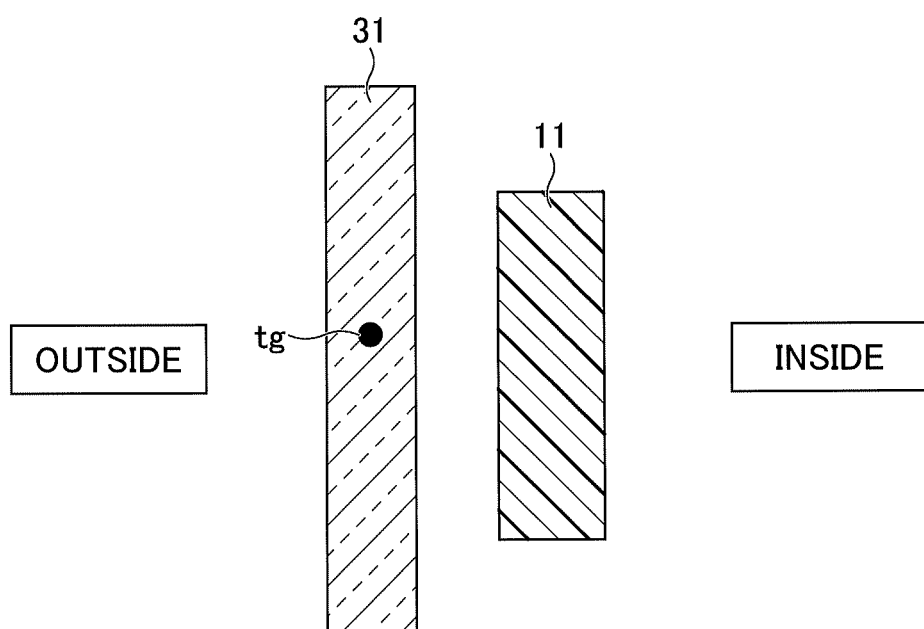
FIG. 14 is a drawing illustrating a measurement position of a glass sheet.

A stress generated on an edge of the glass sheet 31 are calculated based on "AGC Architectural Glass General Catalog Technical Data". Thus, the temperature $t_g$ of the center of the glass sheet 31 illustrated in FIG. 14, the temperature $t_s$ of the window frame 33 on each antenna installation plate are measured. Subsequently, various coefficients (a basic stress coefficient $k_0$, a shadow coefficient $k_1$, a curtain shadow coefficient $k_2$, an area coefficient $k_3$, and an edge temperature coefficient f) are obtained.

The various coefficients are defined as follows.

The basic stress coefficient $k_0$ is 0.47 MPa/° C. When sunlight does not shine on a surface of the glass uniformly and a part of a surface of the glass is in the shadow, a temperature distribution inside the glass sheet is changed and a thermal stress is increased compared with a thermal stress generated when there are no shadows. The shadow coefficient $k_1$ indicates a ratio of a thermal stress increase, compared with a thermal stress generated when there are no shadows.

Although an amount of sunlight is the same, as a curtain or blind on the indoor side of the glass enhances a reflection of sunlight and second thermal radiation, the temperature of the center of the glass rises compared with a temperature measured when there are no curtains and blinds, and a difference in the temperature is increased. The curtain shadow coefficient $k_2$ indicates this ratio. Even when a difference in the temperature is the same, the larger an area of the glass is, the larger an absolute value of thermal expansion is, and a heat stress is increased compared with a heat stress of the glass with a small area. The area coefficient $k_3$ indicates this as a ratio per 1.0 m² area of the glass.

The edge temperature coefficient f is defined the expression (i) below.

$$f=(t_g-t_e)/(t_g-t_s) \quad \text{(i)}$$

The various coefficients are selected from values mainly defined based on experimental results in consideration of conditions of the glass sheet 31 of the time. Subsequently, by using the temperature $t_g$ of the center of the glass sheet 31, the temperature $t_s$ of the window frame 33, and various coefficients, a stress σ generated on the edge of the glass sheet 31 is calculated based on the expression (ii) below.

$$\sigma=k_0 \times k_1 \times k_2 \times k_3 \times f \times (t_g-t_s) \quad \text{(ii)}$$

Example 1-2 and Example 1-3

The glass sheet with the antenna 30 illustrated in FIG. 7 is produced in the same condition of the example 1-1 except that average thickness of the fixing portion 13A is changed to 2.0 mm or 3.0 mm in the example 1-1. When average solar absorptance of the plate accommodating an antenna is 20%, 40%, 60%, and 90%, the temperature $T_g$ of the second main surface 312, which faces toward the antenna installation plate 12, of the glass sheet 31, the air flow volume which flows in the space S per unit area of the antenna installation plate 12, and a stress generated on an edge of the glass sheet 31, are measured.

Example 1-4

The glass sheet with the antenna 30 illustrated in FIG. 7 is produced in the same condition of the example 1-1 except that the size of the antenna installation plate 12 is 400 mm width (the X-axis direction) by 800 mm height (the Z-axis direction), and average thickness of the fixing portion 13A is changed to 6.0 mm in the example 1-1. When average solar absorptance of the plate accommodating an antenna is 20%, 40%, 60%, and 90%, the temperature $T_g$ of the second main surface 312, which faces toward the antenna installation plate 12, of the glass sheet 31, the air flow volume which flows in the space S per unit area of the antenna installation plate 12, and a stress generated on an edge of the glass sheet 31 are measured.

Example 1-5

The glass sheet with the antenna 30 illustrated in FIG. 7 is produced in the same condition of the example 1-1 except that the size of the antenna installation plate 12 is 100 mm width (the X-axis direction) by 100 mm height (the Z-axis direction), and average thickness of the fixing portion 13A is changed to 0.5 mm in the example 1-1. When average solar absorptance of the plate accommodating an antenna is 20%, 40%, 60%, and 90%, the temperature $T_g$ of the second main surface 312, which faces toward the antenna installation plate 12, of the glass sheet 31, the air flow volume which flows in the space S per unit area of the antenna installation plate 12, and a stress generated on an edge of the glass sheet 31 are measured.

Example 1-6

The glass sheet with the antenna 30 illustrated in FIG. 7 is produced in the same condition of the example 1-1 except that the size of the antenna installation plate 12 is 100 mm width (the X-axis direction) by 100 mm height (the Z-axis direction), in the example 1-1. When average solar absorptance of the plate accommodating an antenna is 20%, 40%, 60%, and 90%, the temperature $T_g$ of the second main surface 312, which faces toward the antenna installation plate 12, of the glass sheet 31, the air flow volume which flows in the space S per unit area of the antenna installation plate 12, and a stress generated on an edge of the glass sheet 31 are measured.

Example 1-7 and Example 1-8

The glass sheet with the antenna 30 illustrated in FIG. 7 is produced in the same condition of the example 1-1 except that the size of the antenna installation plate 12 is 100 mm width (the X-axis direction) by 100 mm height (the Z-axis direction), and average thickness of the fixing portion 13A is changed to 2.0 mm or 3.0 mm in the example 1-1. When average solar absorptance of the plate accommodating an antenna is 20%, 40%, 60%, and 90%, the temperature $T_g$ of the second main surface 312, which faces toward the antenna installation plate 12, of the glass sheet 31, the air flow volume which flows in the space S per unit area of the antenna installation plate 12, and a stress generated on an edge of the glass sheet 31 are measured.

Example 1-9 to Example 1-11

The glass sheet with the antenna 30 illustrated in FIG. 7 is produced in the same condition of the example 1-1 except that air is blown into the space S forcibly by a blower and an air flow volume is changed in the example 1-1. When average solar absorptance of the plate accommodating an antenna is 20%, 40%, 60%, and 90%, the temperature $T_g$ of the second main surface 312, which faces toward the antenna installation plate 12, of the glass sheet 31, the air flow volume which flows in the space S per unit area of the antenna installation plate 12, and a stress generated on an edge of the glass sheet 31 are measured.

Example 1-12 to Example 1-14

The glass sheet with the antenna 30 illustrated in FIG. 7 is produced in the same condition of the example 1-1 except that average thickness of the fixing portion 13A is changed to 5.0 mm, 15.0 mm, or 25.0 mm in the example 1-1. When average solar absorptance of the plate accommodating an antenna is 20%, 40%, 60%, and 90%, the temperature $T_g$ of the second main surface 312, which faces toward the antenna installation plate 12, of the glass sheet 31, the air flow volume which flows in the space S per unit area of the antenna installation plate 12, and a stress generated on an edge of the glass sheet 31 are measured.

Example 1-15

The example 1-15 is an example in which the antenna installation plate 12 is directly provided to the glass sheet 31. The glass sheet with the antenna 30 is produced in the same condition of the example 1-1 except that average thickness of the fixing portion 13A is changed to 0.0 mm in the example 1-1. When average solar absorptance of the plate accommodating an antenna is 20%, 40%, 60%, and 90%, the temperature $T_g$ of the second main surface 312, which faces toward the antenna installation plate 12, of the glass sheet 31, the air flow volume which flows in the space S per unit area of the antenna installation plate 12, and a stress generated on an edge of the glass sheet 31 are measured.

Example 1-16

The example 1-16 is an example in which the space S that is formed among the glass sheet 31, the antenna installation plate 12, and glass is sealed. The glass sheet with the antenna 30 is produced in the same condition of the example 1-1 except that the space S is sealed so that air cannot be flowed through the space S in the example 1-1. When average solar absorptance of the plate accommodating an antenna is 20%, 40%, 60%, and 90%, the temperature $T_g$ of the second main surface 312, which faces toward the antenna installation plate 12, of the glass sheet 31, the air flow volume which flows in the space S per unit area of the antenna installation plate 12, and a stress generated on an edge of the glass sheet 31 are measured.

Example 1-17

The example 1-17 is an example in which the space S that is formed among the glass sheet 31, the antenna installation plate 12, and glass is sealed. The glass sheet with the antenna 30 is produced in the same condition of the example 1-1 except that average thickness of the fixing portion 13A is 6.0 mm, and the space S is sealed so that air cannot be flowed through the space S in the example 1-1. When average solar absorptance of the plate accommodating an antenna is 20%, 40%, 60%, and 90%, the temperature $T_g$ of the second main surface 312, which faces toward the antenna installation plate 12, of the glass sheet 31, the air flow volume which flows in the space S per unit area of the antenna installation plate 12, and a stress generated on an edge of the glass sheet 31 are measured.

Table 1 indicates the size of the antenna installation plate 12, average thickness of the fixing portion 13A, an existence of ventilation in the space S, the temperature of the second main surface 312, which faces toward the antenna installation plate 12, of the glass sheet 31, the air flow volume which flows in the space S per unit area of the antenna installation plate 12, and a stress generated on an edge of the glass sheet 31 for each example. The hatched locations in Table 1 indicate that a thermal breakage of the glass sheet 31 may occur. A stress that may cause a thermal breakage on the glass sheet 31 is determined based on 17.7 MPa, which is a stress that the glass sheet 31 can allow for a short term.

TABLE 1

| EXAMPLE | SIZE OF ANTENNA INSTALLATION PLATE (X-AXIS DIRECTION × Z-AXIS DIRECTION) (mm) | FIXING PORTION AVERAGE THICKNESS (mm) | SPACE VENTILATED/ SEALED | TEMPERATURE ON MAIN SURFACE OF ANTENNA INSTALLATION PLATE SIDE OF GLASS SHEET (° C.) AVERAGE SOLAR ABSORPTION OF ANTENNA INSTALLATION PLATE | | | |
|---|---|---|---|---|---|---|---|
| | | | | 20% | 40% | 60% | 90% |
| EXAMPLE 1-1 | 400 × 400 | 1.0 | VENTILATED (NATURALLY) | 22.9 | 26.4 | 29.9 | 35.2 |
| EXAMPLE 1-2 | 400 × 400 | 2.0 | VENTILATED (NATURALLY) | 22.7 | 26.0 | 29.2 | 33.9 |
| EXAMPLE 1-3 | 400 × 400 | 3.0 | VENTILATED (NATURALLY) | 22.6 | 25.6 | 28.6 | 32.9 |
| EXAMPLE 1-4 | 400 × 800 | 6.0 | VENTILATED (NATURALLY) | 22.5 | 25.3 | 28.1 | 32.2 |
| EXAMPLE 1-5 | 100 × 100 | 0.5 | VENTILATED (NATURALLY) | 22.9 | 26.3 | 29.8 | 34.9 |
| EXAMPLE 1-6 | 100 × 100 | 1.0 | VENTILATED (NATURALLY) | 22.7 | 25.9 | 29.1 | 33.7 |
| EXAMPLE 1-7 | 100 × 100 | 2.0 | VENTILATED (NATURALLY) | 22.4 | 25.3 | 28.0 | 32.1 |
| EXAMPLE 1-8 | 100 × 100 | 3.0 | VENTILATED (NATURALLY) | 22.2 | 24.8 | 27.4 | 31.1 |
| EXAMPLE 1-9 | 400 × 400 | 1.0 | VENTILATED (FORCIBLY) | 22.4 | 25.5 | 28.5 | 33.1 |
| EXAMPLE 1-10 | 400 × 400 | 1.0 | VENTILATED (FORCIBLY) | 22.0 | 24.5 | 26.9 | 30.5 |
| EXAMPLE 1-11 | 400 × 400 | 1.0 | VENTILATED (FORCIBLY) | 21.5 | 23.5 | 25.4 | 28.1 |
| EXAMPLE 1-12 | 400 × 400 | 5.0 | VENTILATED (NATURALLY) | 22.6 | 24.6 | 26.6 | 28.5 |
| EXAMPLE 1-13 | 400 × 400 | 15.0 | VENTILATED (NATURALLY) | 22.0 | 23.5 | 25.0 | 26.4 |

TABLE 1-continued

| EXAMPLE | | | | | | | |
|---|---|---|---|---|---|---|---|
| EXAMPLE 1-14 | 400 × 400 | 25.0 | VENTILATED (NATURALLY) | 21.7 | 23.0 | 24.3 | 25.6 |
| EXAMPLE 1-15 | 400 × 400 | 0.0 | SEALED | 26.6 | 33.0 | 39.2 | 48.2 |
| EXAMPLE 1-16 | 400 × 400 | 1.0 | SEALED | 24.6 | 29.7 | 34.6 | 41.8 |
| EXAMPLE 1-17 | 400 × 400 | 6.0 | SEALED | 23.1 | 26.9 | 30.5 | 35.8 |

| | VOLUME OF AIR THAT FLOWS IN SPACE S (m³/hr) AVERAGE SOLAR ABSORPTION OF ANTENNA INSTALLATION PLATE | | | | STRESS GENERATED ON EDGES OF GLASS SHEET (MPa) AVERAGE SOLAR ABSORPTION OF ANTENNA INSTALLATION PLATE | | | |
|---|---|---|---|---|---|---|---|---|
| EXAMPLE | 20% | 40% | 60% | 90% | 20% | 40% | 60% | 90% |
| EXAMPLE 1-1 | 0.3 | 0.4 | 0.5 | 0.6 | 11.1 | 14.2 | 17.2 | 21.8 |
| EXAMPLE 1-2 | 0.6 | 0.8 | 0.9 | 1.1 | 10.9 | 13.8 | 16.6 | 20.7 |
| EXAMPLE 1-3 | 0.8 | 1.1 | 1.3 | 1.6 | 10.8 | 13.5 | 16.0 | 19.8 |
| EXAMPLE 1-4 | 2.3 | 3.1 | 3.6 | 4.3 | 10.7 | 13.2 | 15.6 | 19.1 |
| EXAMPLE 1-5 | 0.0 | 0.0 | 0.0 | 0.0 | 11.0 | 14.1 | 17.1 | 21.6 |
| EXAMPLE 1-6 | 0.0 | 0.0 | 0.1 | 0.1 | 10.9 | 13.7 | 16.4 | 20.5 |
| EXAMPLE 1-7 | 0.1 | 0.1 | 0.1 | 0.1 | 10.7 | 13.1 | 15.6 | 19.1 |
| EXAMPLE 1-8 | 0.1 | 0.1 | 0.2 | 0.2 | 10.5 | 12.8 | 15.0 | 18.2 |
| EXAMPLE 1-9 | 2.0 | 2.0 | 2.0 | 2.0 | 10.7 | 13.3 | 16.0 | 20.0 |
| EXAMPLE 1-10 | 5.0 | 5.0 | 5.0 | 5.0 | 10.3 | 12.4 | 14.6 | 17.7 |
| EXAMPLE 1-11 | 10.0 | 10.0 | 10.0 | 10.0 | 9.9 | 11.6 | 13.2 | 15.6 |
| EXAMPLE 1-12 | 1.4 | 1.8 | 2.0 | 2.2 | 10.9 | 12.7 | 14.4 | 16.1 |
| EXAMPLE 1-13 | 3.5 | 4.3 | 4.9 | 5.4 | 10.3 | 11.7 | 13.0 | 14.2 |
| EXAMPLE 1-14 | 5.3 | 6.5 | 7.3 | 8.0 | 10.1 | 11.2 | 12.4 | 13.5 |
| EXAMPLE 1-15 | 0.0 | 0.0 | 0.0 | 0.0 | 14.3 | 19.9 | 25.3 | 33.1 |
| EXAMPLE 1-16 | 0.0 | 0.0 | 0.0 | 0.0 | 12.5 | 17.0 | 21.3 | 27.5 |
| EXAMPLE 1-17 | 0.0 | 0.0 | 0.0 | 0.0 | 11.3 | 14.6 | 17.7 | 22.3 |

As Table 1 clearly indicates, in the example 1-15 to the example 1-17, when average solar absorption of the antenna installation plate 12 is from 40% to 90%, a stress generated on the edge of the glass sheet 31 is large and a possibility to cause a thermal breakage on the glass sheet 31 is high. Thus, the glass sheet with the antenna such as the example 1-15 to the example 1-17 requires a measure of avoiding a thermal breakage.

Compared with the example 1-15 to the example 1-17, in the example 1-1 to the example 1-14, the temperature of the glass sheet 31 is decreased totally, and a stress generated on the edge of the glass sheet 31 is small. It is considered that the space S is formed between the glass sheet 31 and the antenna installation plate 12 so that air can flow in the space S, which can decrease the temperature of the glass sheet 31. Especially, when the average solar absorptance of the antenna installation plate 12 is less than 90%, a stress generated on the edge of the glass sheet 31 is smaller than a stress that the glass sheet 31 can allow for a short term (17.7 MPa), and the possibility to cause a thermal breakage on the glass sheet 31 is decreased.

In the example 1-9 to the example 1-11, the temperature of the glass sheet 31 is decreased, and a stress generated on the edge of the glass sheet 31 is smaller. This is because the temperature of the glass sheet 31 can be decreased by causing air to be flowed forcibly in the space S.

Example 2

Example 2-1

Figure 15:
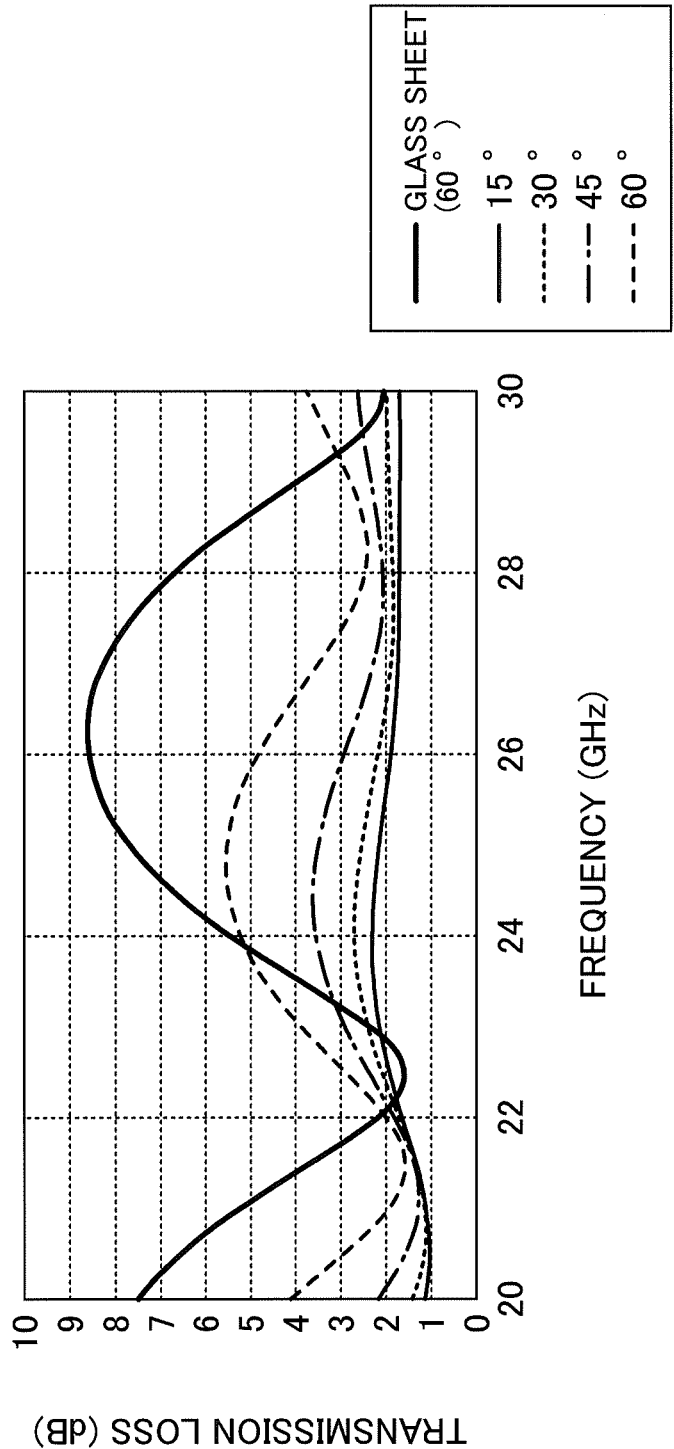
FIG. 15 is a drawing indicating a measurement result of transmission loss of TE waves in an example 2-1.
Figure 16:
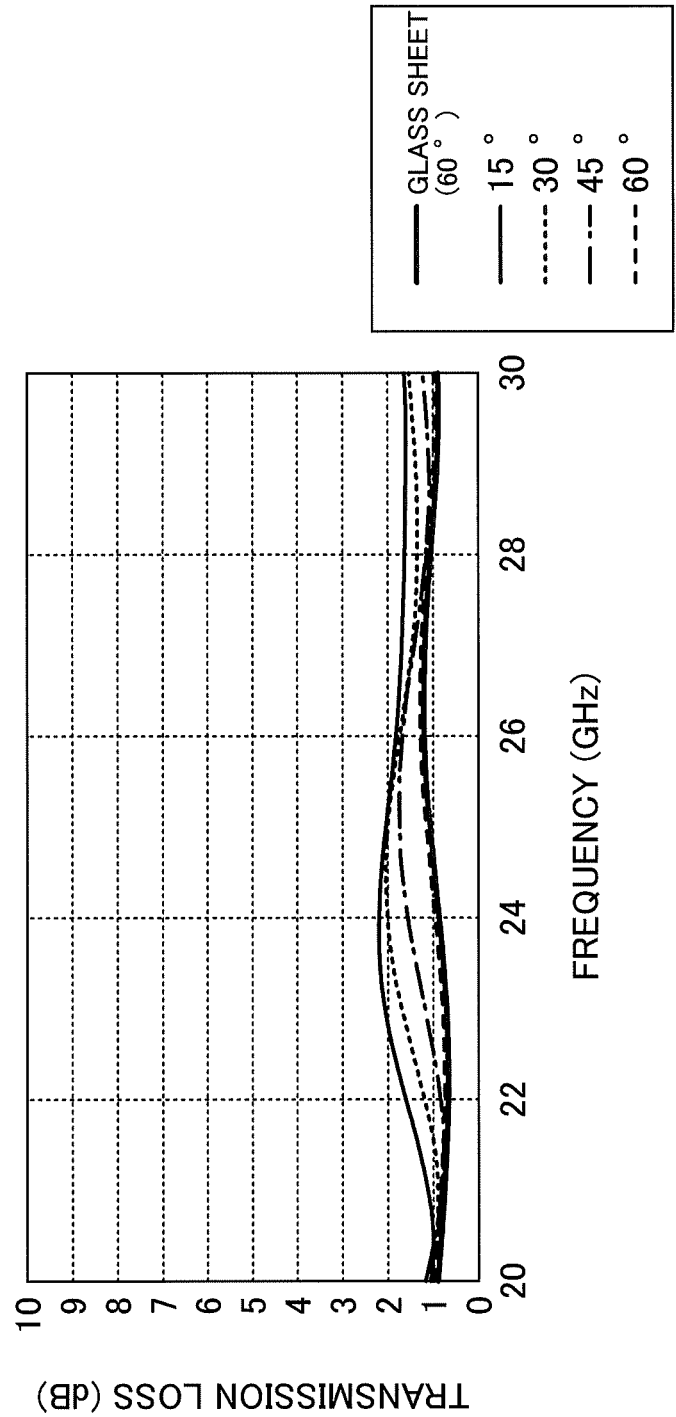
FIG. 16 is a drawing indicating a measurement result of transmission loss of TM waves in an example 2-1.

The antenna unit 10 that provides the dielectric layer 15 on the first main surface 121, which faces toward the glass sheet 31, of the antenna installation plate 12 is produced. The glass sheet with the antenna is produced by attaching the antenna unit 10 to the glass by the fixing portion 13A, and the first layer is the glass sheet 31, and the second layer is the space S, and the third layer is the dielectric layer 15. The glass sheet 31 is formed by using soda-lime glass, and the dielectric layer is formed by using polycarbonate resin. Thickness of the glass sheet 31 is about 8.0 mm, thickness of the space S is about 0.5 mm, and thickness of the dielectric layer is about 10 mm. Transmission loss (TL) of electromagnetic waves is measured by transmitting electromagnetic waves incident to the glass sheet 31 that is produced from the direction opposite to the antenna unit 10 of the glass sheet 31. TE waves and TM waves are measured as electromagnetic waves. FIG. 15 illustrates a measurement result of transmission loss of TE waves, and FIG. 16 illustrates a measurement result of transmission loss of TM waves. In FIG. 15 and FIG. 16, the glass sheet (60°) indicates the transmission loss of the glass sheet 31. A relative permittivity of soda-lime glass is 7-j0.1, and a relative permittivity of air is 1.0, and a relative permittivity of the dielectric layer is 2.8-j0.017.

Example 2-2

Figure 17:
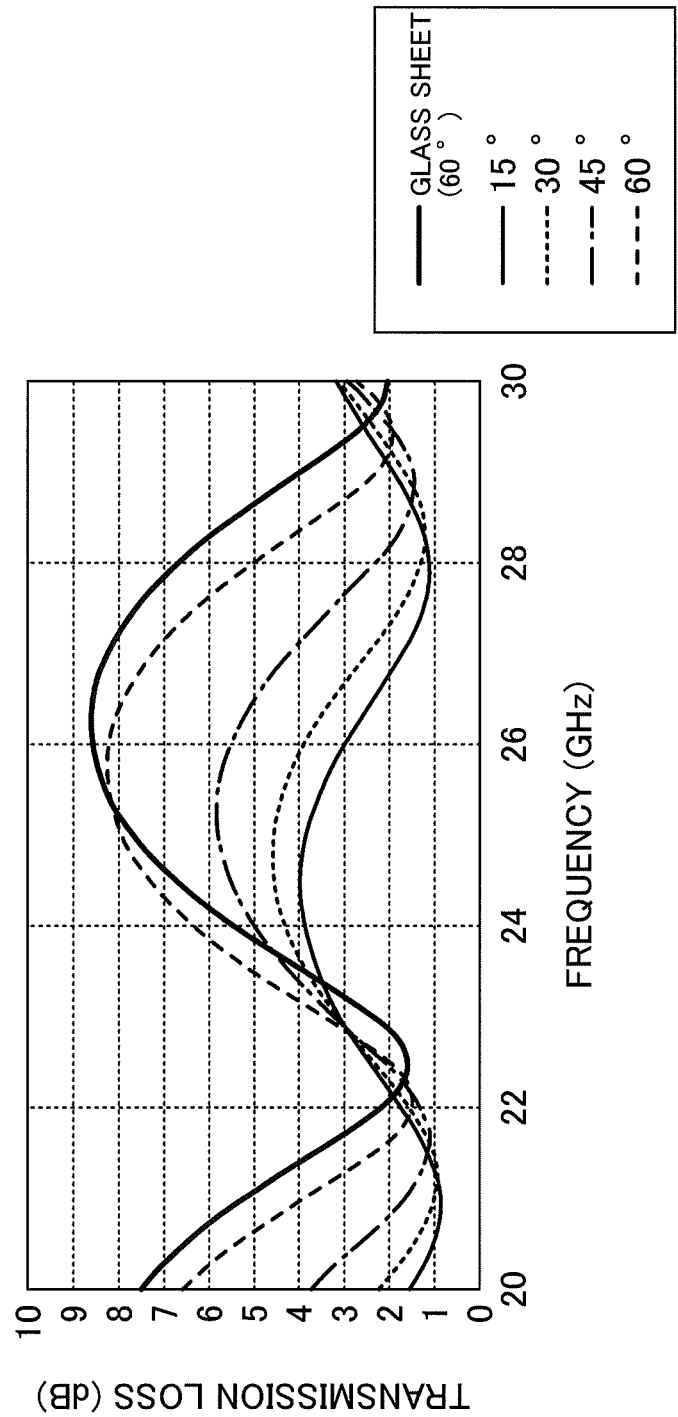
FIG. 17 is a drawing indicating a measurement result of transmission loss of TE waves in an example 2-2.
Figure 18:
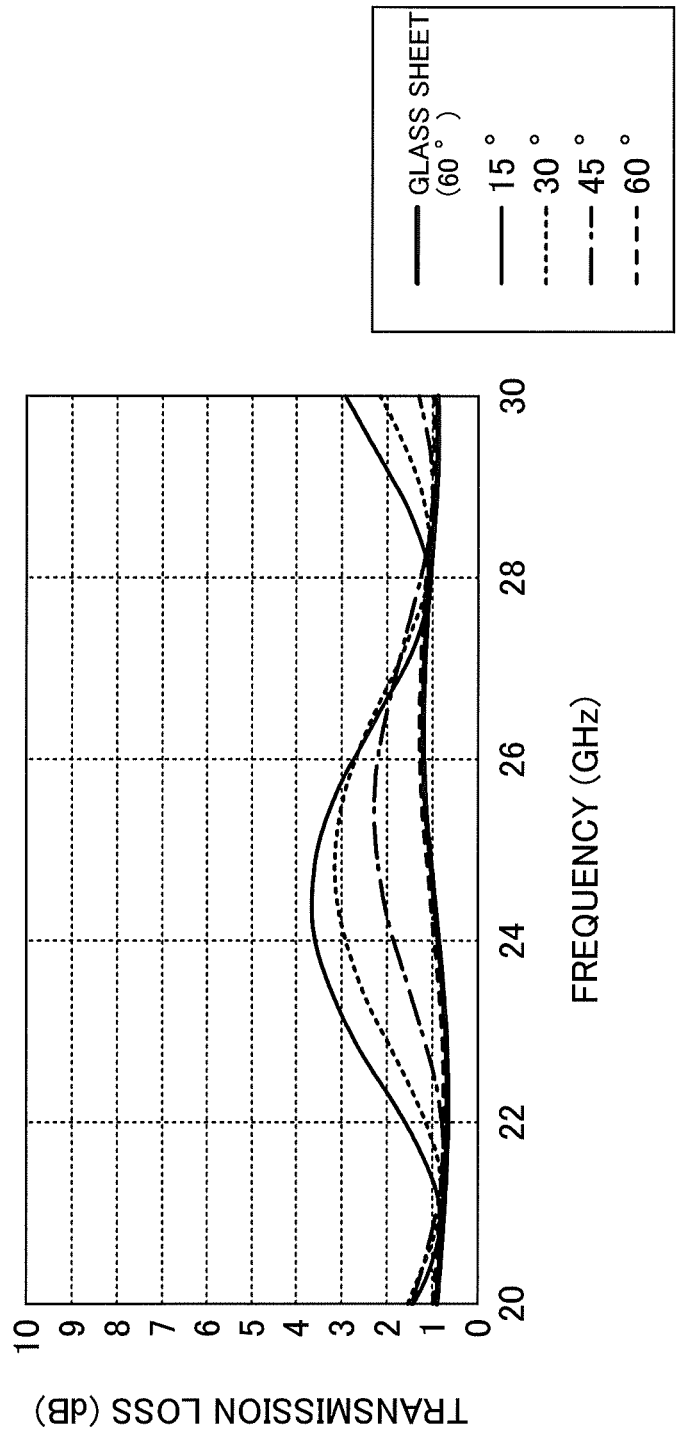
FIG. 18 is a drawing indicating a measurement result of transmission loss of TM waves in an example 2-2.

In the example 2-1, The antenna unit 10 that provides the dielectric layer 15 on the first main surface 121, which faces toward the glass sheet 31, of the antenna installation plate 12, is produced. The electromagnetic wave transmission performance of the glass sheet with the antenna is measured in the same condition of the example 2-1 except that the antenna unit 10 is directly attached to the glass sheet 31 without the fixing portion 13A. FIG. 17 illustrates a measurement result of transmission loss of TE waves, and FIG. 18 illustrates a measurement result of transmission loss of TM waves.

Table 2 indicates types and thickness of the first layer to the third layer in the example 2-1 and the example 2-2.

TABLE 2

| EXAMPLE | FIRST LAYER | | SECOND LAYER | | THIRD LAYER | |
|---|---|---|---|---|---|---|
| | TYPE | THICKNESS (mm) | TYPE | THICKNESS (mm) | TYPE | THICKNESS (mm) |
| EXAMPLE 2-1 | GLASS SUBSTRATE | 8.0 | SPACE | 0.5 | DIELECTRIC LAYER | 1.0 |
| EXAMPLE 2-2 | GLASS SUBSTRATE | 8.0 | DIELECTRIC LAYER | 1.0 | — | — |

As FIG. 15 to FIG. 18 clearly indicates, the example 2-1 indicates smaller range of transmission loss than the example 2-2, and performance of the transmission loss is improved. Thus, the electromagnetic wave transmission performance can be improved by providing a space between the glass sheet 31 and the antenna installation plate 12.

Example 3

The electromagnetic shielding layer 16 is provided on the second main surface 122, which faces the direction opposite to the glass sheet 20, of the antenna installation plate 12, and the antenna unit 10 as illustrated in FIG. 6 is produced. The antenna unit 10 is attached to the glass sheet 31 by the fixing portion 13A, and the glass sheet with the antenna is produced. The electromagnetic shielding layer 16 is a glass sheet that is 6 mm thick and is formed with a transparent conductive film, and the surface resistivity of the electromagnetic shielding layer 16 is 50Ω/□, 20Ω/□, 10Ω/□, 5.0Ω/□, and 3.0Ω/□. The transmission loss (TL) of electromagnetic waves is measured by transmitting electromagnetic waves orthogonal to the electromagnetic shielding layer 16 that is produced. FIG. 19 indicates a measurement result of the transmission loss (TL) of electromagnetic waves incident to the electromagnetic shielding layer 16. As FIG. 19 indicates, when the surface resistivity of the electromagnetic shielding layer 16 is 10Ω/□ or less, it is confirmed that the transmission loss can be about 20 dB or more.

Embodiments have been described above, however the embodiments have been presented by examples only, and the scope of the present invention is not limited by the embodiments. The embodiments described above may be embodied in a variety of other forms, and various combinations, omissions, substitutions and changes in the form of the embodiments may be made without departing from the spirit of the invention. These embodiments and their variants are included in the scope and the spirit of the invention and are included in the scope of the claimed invention and their equivalents.

The present application is based upon and claims the benefit of priority from the prior Japanese Patent Application No. 2017-150241 filed on Aug. 2, 2017, with the Japanese Patent Office, the entire contents of which are incorporated herein by reference.

REFERENCE SIGNS LIST 10 antenna unit for glass (antenna unit)
11 antenna
12 flat plate (antenna installation plate)
13A, 13B fixing portion
15 dielectric layer
16 electromagnetic shielding layer
20, 31 glass sheet
121, 311 first main surface
122, 312 second main surface
21, 33 window frame
30 glass sheet with antenna
35 coating layer
351A, 351B opening portion
36 water-repellent layer
t average thickness
L predetermined length
S space

What is claimed is:

1. An antenna unit for glass, comprising:
an antenna; and
a fixing portion that fixes the antenna to a glass sheet and forms a space between the glass sheet and the antenna such that air flows in the space,
wherein the antenna unit is configured to be installed on an indoor side of the glass sheet and transmits and receives an electromagnetic wave at the indoor side through the glass sheet, and a thickness of the fixing portion is in a range of from 0.5 mm to 100 mm.

2. The antenna unit for glass as claimed in claim 1, wherein the antenna is a flat antenna or an antenna provided on a flat plate.

3. A glass sheet with an antenna, comprising:
a glass sheet; and
the antenna unit of claim 1 installed on the indoor side of the glass sheet.

4. An antenna unit for glass, comprising:
an antenna configured to be installed on a glass sheet such that a space is formed between the glass sheet and the antenna and that air flows in the space; and
a blower that blows the air between the glass sheet and the antenna with a rate of 2 m³/hour or more,
wherein the antenna unit is configured to be installed on an indoor side of the glass sheet and transmits and receives an electromagnetic wave at the indoor side through the glass sheet.

5. A glass sheet with an antenna, comprising:
a glass sheet; and
the antenna unit of claim 4 installed on the indoor side of the glass sheet.

6. An antenna unit for glass, comprising:
an antenna configured to be installed on a glass sheet such that a space is formed between the glass sheet and the antenna and that air flows in the space,
wherein the antenna unit is configured to be installed on an indoor side of the glass sheet and transmits and receives an electromagnetic wave at the indoor side through the glass sheet, and the antenna is a flat antenna or an antenna provided on a flat plate such that average solar absorptance of a main surface of the flat antenna or the flat plate is 60% or less and that the main surface is facing toward the glass sheet.

7. A glass sheet with an antenna, comprising:
a glass sheet; and
the antenna unit of claim 6 installed on the indoor side of the glass sheet.
8. An antenna unit for glass, comprising:
an antenna configured to be installed on a glass sheet such that a space is formed between the glass sheet and the antenna and that air flows in the space,
wherein the antenna unit is configured to be installed on an indoor side of the glass sheet and transmits and receives an electromagnetic wave at the indoor side through the glass sheet, and the antenna is a flat antenna or an antenna provided on a flat plate such that arithmetic average roughness Ra of a main surface of the flat antenna or the flat plate is 1.2 µm or less and that the main surface is facing toward the glass sheet.
9. A glass sheet with an antenna, comprising:
a glass sheet; and
the antenna unit of claim 8 installed on the indoor side of the glass sheet.
10. An antenna unit for glass, comprising:
an antenna configured to be installed on a glass sheet such that a space is formed between the glass sheet and the antenna, that air flows in the space and that the antenna is a flat antenna or an antenna provided on a flat plate; and
a dielectric layer formed on a main surface of the flat antenna or the flat plate,
wherein the antenna unit is configured to be installed on an indoor side of the glass sheet and transmits and receives an electromagnetic wave at the indoor side through the glass sheet, and the main surface of the flat antenna or the flat plate is facing toward the glass sheet.
11. The antenna unit for glass as claimed in claim 10, wherein arithmetic average roughness Ra of a main surface of the dielectric layer is 1.2 µm or less.
12. The antenna unit for glass as claimed in claim 10, wherein the antenna is provided in a casing.
13. A method of producing an antenna unit for glass, comprising:
attaching the antenna unit of claim 10, to a glass sheet by the fixing portion such that the space is formed between the glass sheet and the antenna.
14. A glass sheet with an antenna, comprising:
a glass sheet; and
the antenna unit of claim 10 installed on the indoor side of the glass sheet.
15. An antenna unit for glass, comprising:
an antenna configured to be installed on a glass sheet such that a space is formed between the glass sheet and the antenna, that air flows in the space and that the antenna is a flat antenna or an antenna provided on a flat plate; and
an electromagnetic shielding layer formed on a main surface of the flat antenna or the flat plate,
wherein the antenna unit is configured to be installed on an indoor side of the glass sheet and transmits and receives an electromagnetic wave at the indoor side through the glass sheet, and the main surface of the flat antenna or the flat plate is facing away from the glass sheet.
16. A glass sheet with an antenna, comprising:
a glass sheet; and
the antenna unit of claim 15 installed on the indoor side of the glass sheet.

17. An antenna unit for glass, comprising:
a flat plate;
an antenna provided on the flat plate and configured to be installed on a glass sheet such that a space is formed between the glass sheet and the antenna and that air flows in the space; and
at least one electromagnetic wave absorption element formed on a main surface of the flat plate,
wherein the antenna unit is configured to be installed on an indoor side of the glass sheet and transmits and receives an electromagnetic wave at the indoor side through the glass sheet, and the main surface of the flat plate is facing away from the glass sheet.
18. A glass sheet with an antenna, comprising:
a glass sheet; and
the antenna unit of claim 17 installed on the indoor side of the glass sheet.
19. An antenna unit for glass, comprising:
an antenna configured to be installed on a glass sheet such that a space is formed between the glass sheet and the antenna and that air flows in the space,
wherein the antenna unit is configured to be installed on an indoor side of the glass sheet and transmits and receives an electromagnetic wave at the indoor side through the glass sheet, and visible light transmittance of the antenna is 40% or more.
20. A glass sheet with an antenna, comprising:
a glass sheet; and
the antenna unit of claim 19.
21. A glass sheet with an antenna, comprising:
a glass sheet;
an antenna unit comprising an antenna and installed on an indoor side of the glass sheet such that the antenna unit transmits an electromagnetic wave at the indoor side to an outdoor side through the glass sheet and receives an electromagnetic wave at the indoor side from the outdoor side through the glass sheet; and
a coating layer formed on a main surface of the glass sheet such that the main surface is facing toward the antenna unit,
wherein the antenna of the antenna unit is a flat antenna or an antenna provided on a flat plate, and the coating layer includes an opening portion formed at a position corresponding to the flat antenna or the flat plate, and at least as large as the flat antenna or the flat plate.
22. The glass sheet with the antenna as claimed in claim 21, wherein, in a plane view, the flat antenna or the flat plate is formed as a rectangle, and an area of the opening portion is greater than or equal to a value obtained by an expression (1), a×b, where a variable a is a length of one side of the flat antenna or the flat plate, and b is a length of another side of the flat antenna or the flat plate.
23. A glass sheet with an antenna, comprising:
a glass sheet; and
the antenna unit of claim 21 installed on the indoor side of the glass sheet.
24. A glass sheet with an antenna, comprising:
a glass sheet;
an antenna unit comprising an antenna and installed on an indoor side of the glass sheet such that the antenna unit transmits an electromagnetic wave at the indoor side to an outdoor side through the glass sheet and receives an electromagnetic wave at the indoor side from the outdoor side through the glass sheet; and
a water-repellent layer formed on a main surface of the glass sheet such that the main surface of the glass sheet faces a direction opposite to the antenna unit.

25. A glass sheet with an antenna, comprising:
a glass sheet; and
the antenna unit of claim 24 installed on the indoor side of the glass sheet.
26. A glass sheet with an antenna, comprising:
a glass sheet;
an antenna unit comprising an antenna and installed on an indoor side of the glass sheet such that the antenna unit transmits an electromagnetic wave at the indoor side to an outdoor side through the glass sheet and receives an electromagnetic wave at the indoor side from the outdoor side through the glass sheet; and
an electromagnetic shielding layer formed on a main surface of the glass sheet and on a region different from a region where the antenna unit is provided such that the main surface is facing toward the antenna unit.
27. A glass sheet with an antenna, comprising:
a glass sheet; and
the antenna unit of claim 26 installed on the indoor side of the glass sheet.

\* \* \* \* \*